US012632109B2

(12) United States Patent
Yuan et al.

(10) Patent No.: US 12,632,109 B2
(45) Date of Patent: May 19, 2026

(54) SENSING DEVICES AND GLOVES FOR CAPTURING HAND ACTIONS

(71) Applicant: SHENZHEN SHOKZ CO., LTD., Shenzhen (CN)

(72) Inventors: Yongshuai Yuan, Shenzhen (CN); Wenjun Deng, Shenzhen (CN); Yujia Huang, Shenzhen (CN); Wenbing Zhou, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/822,260

(22) Filed: Sep. 1, 2024

(65) Prior Publication Data
US 2024/0419245 A1     Dec. 19, 2024

Related U.S. Application Data

(63) Continuation of application No. PCT/CN2022/140050, filed on Dec. 19, 2022.

(30) Foreign Application Priority Data

Aug. 22, 2022    (CN) .......................... 202211006787.3

(51) Int. Cl.
*G06F 3/01* (2006.01)
*H04R 1/10* (2006.01)

(52) U.S. Cl.
CPC ............. *G06F 3/014* (2013.01); *H04R 1/105* (2013.01); *H04R 1/1066* (2013.01)

(58) Field of Classification Search
CPC ......... G06F 3/014; G06F 3/015; H04R 1/105; H04R 1/1066; H04R 2460/13;
(Continued)

(56) References Cited

U.S. PATENT DOCUMENTS

| 5,573,007 A | 11/1996 | Bobo, Sr. |
| 10,481,689 B1 | 11/2019 | Jeromin |

(Continued)

FOREIGN PATENT DOCUMENTS

| CN | 106648116 A | 5/2017 |
| CN | 108693956 A | 10/2018 |

(Continued)

OTHER PUBLICATIONS

International Search Report in PCT/CN2022/140050 mailed on Mar. 17, 2023, 8 pages.
(Continued)

*Primary Examiner* — Chanh D Nguyen
*Assistant Examiner* — Gloryvid Figueroa-Gibson
(74) *Attorney, Agent, or Firm* — METIS IP LLC

(57) ABSTRACT

A sensing device may be provided. The sensing device may include a flexible sealing structure and a pressure sensing unit. The flexible sealing structure is provided at a joint of a user, and the flexible sealing structure is filled with fluid inside. The pressure sensing unit is in fluid communication with the flexible sealing structure. A pressure of the fluid inside the flexible sealing structure changes in response to a deformation of the joint of the user, and the pressure sensing unit converts a change in the pressure of the fluid into an electrical signal.

12 Claims, 18 Drawing Sheets

600

(58) Field of Classification Search
CPC ............... H04R 1/1091; H04R 1/1041; H04R
2201/10; A61B 2562/168; A61B 5/1071;
A61B 5/1125; A61B 5/1126; A61B
5/6806; A61B 5/6826; A61B 5/6815;
A61B 5/6885; A61B 5/6898; G01L 9/08;
G01L 11/04; G01L 27/002; G02B 27/017
See application file for complete search history.

(56) References Cited

U.S. PATENT DOCUMENTS

| | | |
|---|---|---|
| 11,262,797 B1 | 3/2022 | Hoen et al. |
| 2009/0025483 A1 | 1/2009 | Connor et al. |
| 2011/0159939 A1* | 6/2011 | Lin .................... A63B 71/0605 |
| | | 463/8 |
| 2011/0234483 A1 | 9/2011 | Lan et al. |
| 2021/0373663 A1 | 12/2021 | Matusik et al. |

FOREIGN PATENT DOCUMENTS

| | | |
|---|---|---|
| CN | 109407836 A | 3/2019 |
| CN | 109925166 A | 6/2019 |
| CN | 112230769 A | 1/2021 |
| WO | 2024040306 A1 | 2/2024 |

OTHER PUBLICATIONS

Written Opinion in PCT/CN2022/140050 mailed on Mar. 17, 2023, 8 pages.
The Extended European Search Report in European Application No. 22956346.5 mailed on Feb. 14, 2025, 8 pages.

* cited by examiner

200

Extension direction

400

Extension direction

600

600

900

9221

922

920

9222

921

910

1000

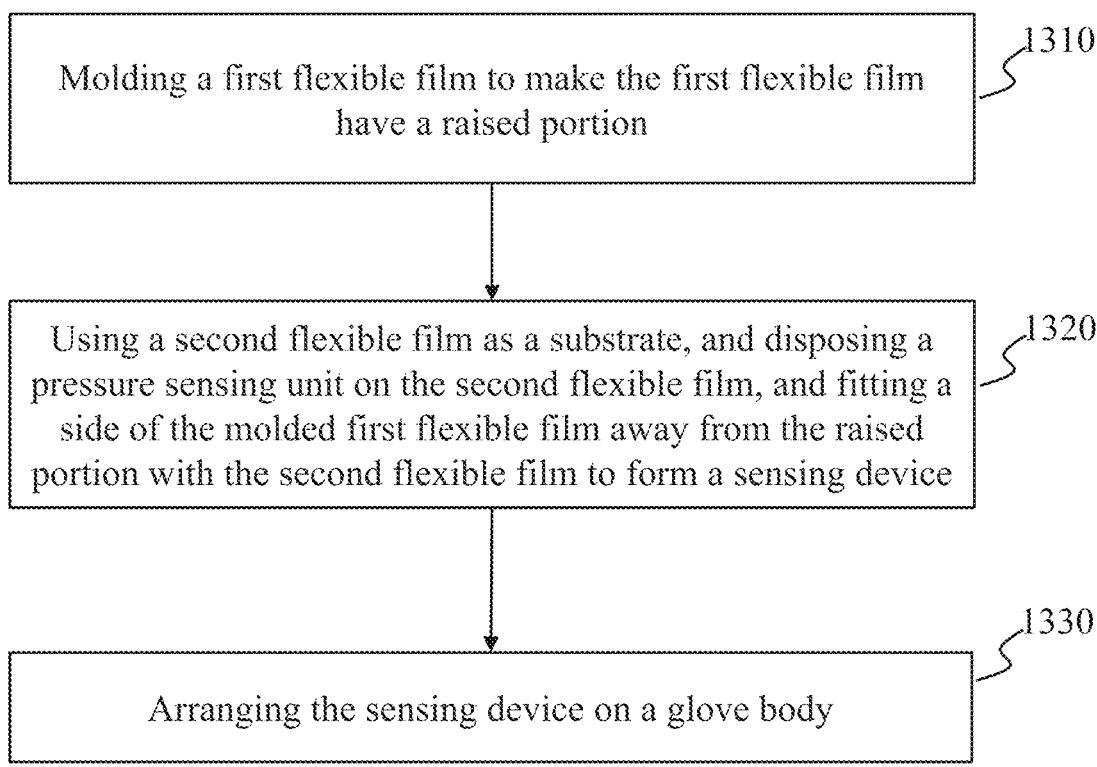

1300

Molding a first flexible film to make the first flexible film have a raised portion — 1310

Using a second flexible film as a substrate, and disposing a pressure sensing unit on the second flexible film, and fitting a side of the molded first flexible film away from the raised portion with the second flexible film to form a sensing device — 1320

Arranging the sensing device on a glove body — 1330

SENSING DEVICES AND GLOVES FOR CAPTURING HAND ACTIONS

CROSS-REFERENCE TO RELATED APPLICATIONS

The present disclosure is a Continuation of International Patent Application No. PCT/CN2022/140050, filed on Dec. 19, 2022, which claims priority to Chinese application No. 202211006787.3, filed Aug. 22, 2022, the entire contents of each of which are incorporated herein by reference.

TECHNICAL FIELD

The preset disclosure relates to the field of wearable devices, and in particular, to a sensing device and a glove for capturing a hand action.

BACKGROUND

With the rise of the meta-universe, sensing devices such as gloves and sensing suits for action capture and gesture measurement are receiving more and more attention as important human-computer interaction platforms. For capturing hand actions, most of the existing gloves capture the hand action of the joints through sensing manners such as 9-axis positional sensing, magnetic localization sensing, optical sensing, etc., but due to their high technical threshold and high price, it is not conducive to popularization and promotion. Additionally, some gloves using electrical resistances utilize resistive strain sensors affixed to the gloves to sense the finger actions, but the sensing manner is less robust and prone to false touch signals.

Therefore, there is a need to propose a sensing device and a glove for capturing a hand action, which can be simple and effective for action capture of knuckles, and the sensing signals are robust to the sensor position, which can obtain effective sensing signals when deviating from the knuckles.

SUMMARY

One of the embodiments of the present disclosure provides a sensing device, comprising: a flexible sealing structure provided at a joint of a user, the flexible sealing structure being filled with fluid inside; and a pressure sensing unit, the pressure sensing unit being in fluid communication with the flexible sealing structure. A pressure of the fluid inside the flexible scaling structure changes in response to a deformation of the joint of the user, and the pressure sensing unit converts a change in the pressure of the fluid into an electrical signal.

One of the embodiments of the present disclosure further provides a wearable device, comprising a wearing body; at least one sensing device provided on the wearing body. The at least one sensing device includes: a flexible sealing structure provided at a joint of a user, the flexible sealing structure being filled with fluid inside; and a pressure sensing unit, the pressure sensing unit being in fluid communication with the flexible sealing structure, a pressure of the fluid inside the flexible sealing structure changing in response to a deformation of the joint of the user, the pressure sensing unit converting a change in the pressure of the fluid into an electrical signal; and a processor, configured to recognize a bending angle of the joint of the user based on the electrical signal.

One of the embodiments of the present disclosure further provides a glove for capturing a hand action, comprising: a glove body, including a finger body and a palm body and at least one sensing device provided on the glove body. The at least one sensing device includes: a flexible sealing structure provided at a knuckle of a user, the flexible sealing structure being filled with fluid inside; and a pressure sensing unit, the pressure sensing unit being in communication with the fluid inside the flexible sealing structure, a pressure of the fluid inside the flexible sealing structure changing in response to a deformation of the knuckle of the user, the pressure sensing unit converting a change in the pressure of the fluid into an electrical signal; and a processor, configured to recognize the hand action of the user based on the electrical signal.

One of the embodiments of the present disclosure further provides a method for preparing a glove for capturing a hand action, comprising: molding a first flexible film to make the first flexible film have a raised portion; using a second flexible film as a substrate, and fitting a side of the molded first flexible film away from the raised portion with the second flexible film to form a semi-sealed structure between the raised portion and the substrate; placing a pressure sensing unit within the semi-sealed structure and sealing the semi-sealed structure to form a sensing device; and arranging the sensing device on a glove body.

One of the embodiments of the present disclosure further provides a system for recognizing a hand action, comprising: a glove, configured to be worn on a hand of a user and generate an electrical signal based on movement of the hand of the user; and a processor, configured to determine a hand action of the user based on the electrical signal.

One of the embodiments of the present disclosure further provides a virtual reality system based on action capture, comprising: a virtual reality device, configured to display virtual reality information; a glove, configured to capture a hand action of a user and provide feedback on virtual reality information based on the hand action of the user; and a computer device, the computer device being communicatively connected to the glove and the virtual reality device.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, where:

FIG. 13 is a flowchart illustrating a process for preparing another glove according to some embodiments of the present disclosure;

DETAILED DESCRIPTION

Figure 1:
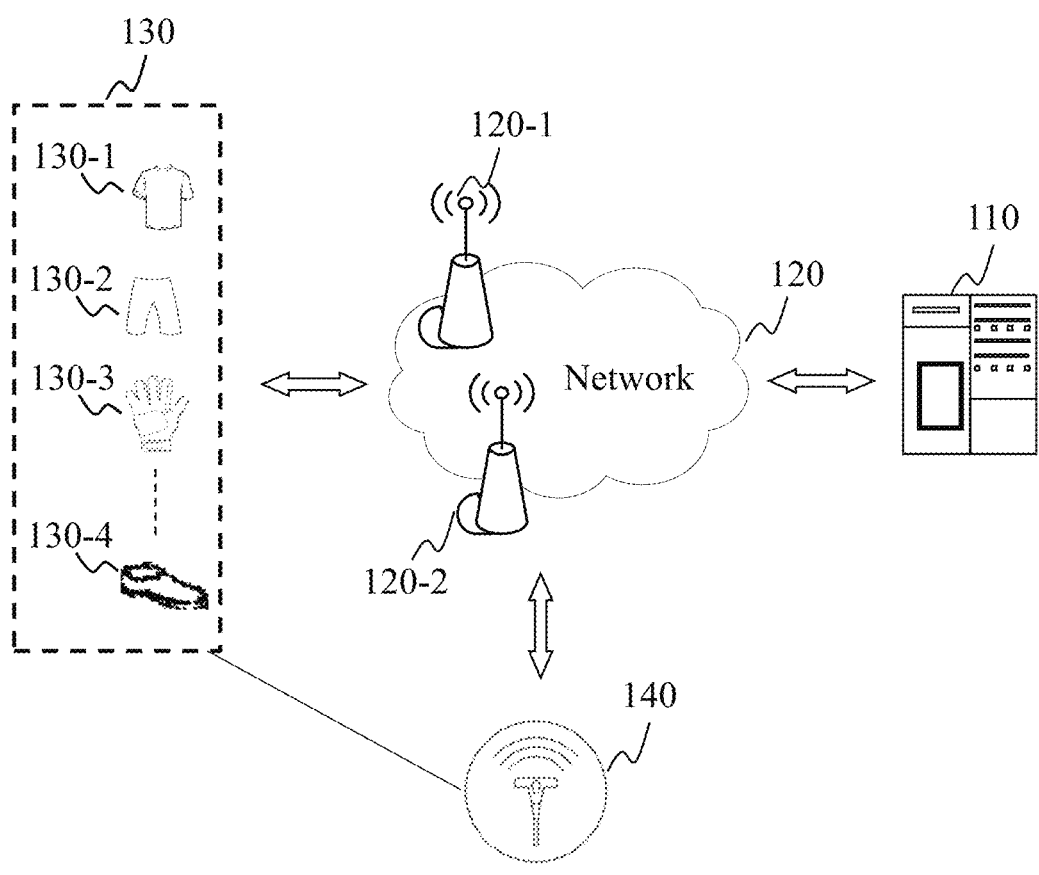
FIG. 1 is a schematic diagram illustrating an exemplary application scenario of a sensing device according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios based on the accompanying drawings without creative labor. Unless obviously obtained from the context or the context illustrates otherwise, the same numeral in the drawings refers to the same structure or operation.

Embodiments of the present disclosure provide a sensing device comprising a flexible sealing structure provided at a joint of a user and a pressure sensing unit. The flexible sealing structure is filled with fluid inside, the pressure sensing unit is in fluid communication with the flexible sealing structure, and a pressure of the fluid inside the flexible sealing structure changes in response to a deformation of the joint of the user, and the pressure sensing unit converts a change in the pressure of the fluid into an electrical signal. When a position of the joint of the user moves, the position of the joint generates a load on the flexible sealing structure, and the flexible sealing structure deforms under an action of an external load so that a volume of a closed cavity changes, thereby causing the change in the pressure of the fluid inside the closed cavity. The pressure sensing unit senses the change in the pressure of the fluid and converts the change in the pressure of the fluid into the electrical signal, and the electrical signal is further acquired by a processor and further analyzed. The acquisition of movement information about the position of the joint of the user may be realized through the above process. The sensing device takes the change of the pressure as a reference of the movement of the joint, which is simple in structure, and the sensing device has a small dependence on an accurate position of the sensing device and has a strong robustness.

FIG. 1 is a schematic diagram illustrating an exemplary application scenario of a sensing device according to some embodiments of the present disclosure. As shown in FIG. 1, a sensing system 100 may include a processing device 110, a network 120, a wearable device 130, and a sensing device 140. In some embodiments, the sensing system 100 may be applied to a variety of scenarios such as action capture, posture measurement, physiological signal (e.g., heart rate signal) measurement, running sensing, etc.

In some embodiments, the sensing system 100 may perform posture measurement on an action of a user when the user moves. In some embodiments, the sensing device 140 may be provided at a joint of the wearable device 130, and when the user wears the wearable device 130 for movement, the movement of a joint of the body of the user may cause the sensing device 140 located at the joint of the user to deform and generate an electrical signal. The processing device 110 may identify a deformation state of the sensing device 140 based on the electrical signal generated by the sensing device 140. Further, a movement posture of the user during movement, for example, a movement angle of the joint, may be determined based on the deformation state of the sensing device 140. As a result, a correspondence relationship between the electrical signal generated by the sensing device 140 and a movement posture of the joint may be established, thereby realizing the posture measurement of the joint. In some embodiments, the joint may include but is not limited to, any one or more of an elbow joint, a knee joint, a wrist joint, a finger joint (also referred to as a knuckle), a shoulder joint, an ankle joint, etc. In some embodiments, the processing device 110 may also recognize a physiological signal, for example, a heart rate signal, a pulse signal, or the like, from the electrical signal generated by the sensing device 140. For example, when the sensing device 140 is located at a location (e.g., chest, wrist, fingers of the wearable device 130) capable of sensing a heart rate, the processing device 110 may recognize the heart rate signal from the electrical signal.

In some embodiments, the sensing system 100 may perform running action sensing on an action of the user when the user is running. In some embodiments, a plurality of sensing devices 140 may be provided within the wearable device 130 (e.g., a running shoe or a running insole), the plurality of sensing devices 140 corresponding to different parts of a foot of the user, including, but not limited to, the heel, the ball of the foot, the forefoot, or the like. When the user is running in running shoes or running insoles, landing on different parts of the foot may cause different levels of deformation of the sensing device 140 at different locations and generate different electrical signals. The processing device 110 may analyze and judge the part of the foot that lands on the ground, as well as the degree of balance of the force exerted by the left and right feet, based on the electrical signals of the sensing devices 140 located at different locations, so as to realize the running action sensing.

In some embodiments, the processing device 110 may be configured to process the electrical signal generated by the sensing device 140. The processing device 110 may receive the electrical signal generated by the sensing device 140 and process the electrical signal to identify a deformation state of the sensing device 140. In some embodiments, the processing device 110 may determine the deformation state of the sensing device 140 based on the electrical signal generated by the sensing device 140 based on a correspondence relationship between the electrical signal and a change in morphology of the sensing device 140 (e.g., a flexible sealing structure). In some embodiments, the processing device 110 may also determine the deformation state of the sensing device 140 based on the electrical signal generated by the sensing device 140 using a machine learning model. In some embodiments, the processing device 110 may recognize the physiological signal (e.g., the heart rate signal or the pulse signal) from the electrical signal. In some embodiments, the processing device 110 may determine, based on the deformation state of the sensing device 140, whether the user's movement action is standard, for example, to determine whether the user's power generation of the left and right feet is balanced during running, whether the movement angle of the joint is within a standard range, etc.

In some embodiments, the processing device 110 may be local or remote. For example, the processing device 110 may access information stored in the wearable device 130 and/or the sensing device 140 either directly or via the network 120. In some embodiments, the processing device 110 may be directly coupled to the wearable device 130 and/or the sensing device 140 to access information stored therein. For example, the processing device 110 may be located in the wearable device 130 and enable information interaction with the sensing device 140 via the network 120. For another example, the processing device 110 may be disposed in the sensing device 140 and enable information interaction with the wearable device 130 via the network 120. In some embodiments, the processing device 110 may execute on a cloud platform. For example, the cloud platform may include a private cloud, a public cloud, a hybrid cloud, a community cloud, a decentralized cloud, an on-premises cloud, etc., or any combination thereof.

In some embodiments, the processing device 110 may include one or more sub-processing devices (e.g., a single-core processing device or a multi-core processing device). Merely by way of example, the processing device 110 may include a central processing unit (CPU), an application-specific integrated circuit (ASIC), an application-specific instruction processor (ASIP), a graphics processor (GPU), a physical processor (PPU), a digital signal processor (DSP), a field programmable gate array (FPGA), a programmable logic circuit (PLD)), a controller, a microcontroller unit, Reduced Instruction Set Computer (RISC), microprocessor, etc. or any combination of the above.

The network 120 may facilitate the exchange of data and/or information between components in the sensing system 100. In some embodiments, one or more components of the sensing system 100 (e.g., the processing device 110, the wearable device 130, the sensing device 140, etc.) may send data and/or information to other components of the sensing system 100 via the network 120. For example, the electrical signal generated by the sensing device 140 may be transmitted to the processing device 110 via the network 120. In some embodiments, the network 120 may be any type of wired or wireless network. For example, the network 120 may include a cable network, a wired network, a fiber optic network, a telecommunication network, an intranet network, an inter-network network, a local area network (LAN), a wide area network (WAN), a wireless local area network (WLAN), a metropolitan area network (MAN), a public switched telephone network (PSTN), a Bluetooth network, a ZigBee network, a near-field communication (NFC) network, etc. or any combination of the above. In some embodiments, the network 120 may include one or more network entry and exit points. For example, the network 120 may include wired or wireless network ingress and egress points such as a base station and/or an inter-network switching point 120-1, 120-2, . . . through which the one or more components of the sensing system 100 may be connected to the network 120 to exchange data and/or information.

The wearable device 130 refers to a clothing or device that has a wearable function. In some embodiments, the wearable device 130 may include, but is not limited to, a tops device 130-1, a pants device 130-2, a glove device 130-3, and a shoe 130-4, or the like. In some embodiments, one or more sensing devices 140 may be provided in the wearable device 130. For example, the sensing devices 140 may be provided at one or more of an elbow position of the tops device 130-1, a knee position of the pants device 130-2, a knuckle position of the glove device 130-3, and a foot position of the shoe 130-4, respectively. When the user wears the wearable device 130 for movement, the user's movement action may cause the sensing device 140 at a corresponding position to deform, and the deformation of the sensing device 140 may cause a change in the fluid inside the sensing device 140, and the sensing device 140 generates the electrical signal in response to the change in the fluid. The fluid in the present disclosure may include gases, liquids, or mixtures of gases and liquids. For example, the fluid in the present disclosure may include air, inert gases, water, or a combination of air and water.

It should be noted that the wearable device 130 is not limited to the tops device 130-1, the pants device 130-2, the glove device 130-3, and the shoe 130-4 as shown in FIG. 1, but may also include other devices applied to other devices that are required to perform the posture measurements, for example, wrist guards, elbow guards, shoulder guards, knee guards, socks, etc., and without limitation herein, any device that can utilize the sensing device 140 included in the present disclosure is within the scope of protection of the present disclosure.

The sensing device 140 may be a sensing device capable of generating the electrical signal based on the change in the pressure of the fluid. In some embodiments, the sensing device 140 may be disposed in the wearable device 130 (e.g., at a joint and at a foot). The sensing device 140 is connected (e.g., bonded, snap-fit) to the wearable device 130. In some embodiments, the sensing device 140 may be a barometric pressure sensing device. The barometric pressure sensing device may deform in response to an external force and produce a change in the barometric pressure within the interior of the barometric pressure sensing device, and further, the barometric pressure sensing device may generate an electrical signal in response to the change in the barometric pressure. For example, when the barometric pressure sensing device is located at a joint of the wearable device 130, a user's joint movement can deform the barometric pressure sensing device (e.g., a flexible sealing structure of the barometric pressure sensing device) and produce a change in the barometric pressure, and the barometric pressure sensing device generates the electrical signal in response to the change in the barometric pressure. In some embodiments, the sensing device 400 may be a hydraulic sensing device. The hydraulic sensing device deforms under an external force and generates a change in the hydraulic pressure within the hydraulic sensing device, and further, the hydraulic sensing device may generate an electrical signal in response to the change in the hydraulic pressure. In some embodiments, the electrical signal generated by the sensing device 140 may be used to characterize the deformation state of the sensing device 140. For example, there can be a linear relationship between the electrical signal generated by the sensing device 140 and a bending angle of a joint measured by the sensing device 140, i.e., the stronger the electrical signal, the greater the bending angle of the joint of the user's body, and the weaker the electrical signal, the smaller the bending angle of the joint of the user's body. A more detailed description of the sensing device 140 can be found in FIG. 2 to FIG. 16 of the present disclosure, and related descriptions thereof.

In some embodiments, the sensing system 100 may also include other devices or components, e.g., a mobile terminal device and a database. The mobile terminal device may access information or data in the sensing system 100. In some embodiments, the mobile terminal device may be connected to the wearable device 130 and/or the sensing device 140 via the network 120 (e.g., a wired connection, a wireless connection), and the user may obtain, via the mobile terminal device, the electrical signal generated by the sensing device 140 during the user's movement, which may be transmitted via the mobile terminal device to the processing device 110. In some embodiments, the mobile terminal device may include a mobile device, a tablet, a laptop, etc., or any combination thereof. In some embodiments, the mobile device may include a cellular phone, a smart home device, a smart mobility device, a virtual reality device, an augmented reality device, or the like, or any combination thereof. In some embodiments, the smart home device may include a control device for a smart appliance, a smart monitoring device, a smart TV, a smart camera, or the like, or any combination thereof. In some embodiments, the smart mobility device may include a smart phone, a personal digital assistant (PDA), a gaming device, a navigation device, a POS device, etc., or any combination thereof. In some embodiments, the virtual reality device and/or the augmented reality device may include a virtual reality helmet, virtual reality glasses, a virtual reality eye mask, an augmented reality helmet, augmented reality glasses, an augmented reality eye mask, etc., or any combination thereof.

The database may store data, for example, the electrical signal generated by the sensing device 140 and sample data of the deformation state of the sensing device 140 corresponding to the electrical signal (i.e., electrical signal sample data and deformation state sample data). The electrical signal sample data and the deformation state sample data corresponding to the electrical signal sample data may be used for model training. In some embodiments, the database may store information obtained from the wearable device 130 and/or the mobile terminal device. In some embodiments, the database may include mass memory, removable memory, volatile read-write memory (e.g., random access memory RAM), read-only memory (ROM), etc., or any combination thereof. In some embodiments, the database may be connected to the network 120 to communicate with one or more components of the sensing system 100 (e.g., the processing device 110, the wearable device

130, the sensing device 140, the mobile terminal device, etc.). One or more of the components of the sensing system 100 may access data stored in the database via the network 120. In some embodiments, the database may be part of the processing device 110.

Gas is exemplarily illustrated herein as the fluid, and when the sensing device deforms and produces a change in the barometric pressure, the change in the barometric pressure of the sensing device may be related to a change in the volume of a closed cavity of the sensing device (e.g., a flexible cavity 211 shown in FIG. 3, a flexible cavity 411 shown in FIG. 4) resulting from the deformation of the sensing device. The principle is as follows: when the gas is at equilibrium, a relationship between the pressure, the volume, and a temperature of the gas may be expressed by equation (1):

$$pV = nRT \tag{1}$$

where, p denotes the pressure in Pa, V denotes the volume of the gas in $m^3$, T denotes the temperature in K, n denotes the amount of substance of the gas in mol, and R denotes the molar gas constant in J/mol·K.

According to equation (1), a relationship between the pressure and the volume of the gas may be further expressed as equation (2) when the amount of substance of the gas is constant and the temperature is constant:

$$p_1 V_1 = p_2 V_2 \tag{2}$$

According to equation (2), for the gas inside the closed cavity, the volume of the closed cavity is inversely proportional to the barometric pressure inside the closed cavity. Thus, in conjunction with the description above, when the sensing device is applied to the wearable device, the user's movement action deforms the sensing device, to change the volume of the closed cavity of the sensing device, thereby generating a change in the barometric pressure within the closed cavity.

Figure 2:
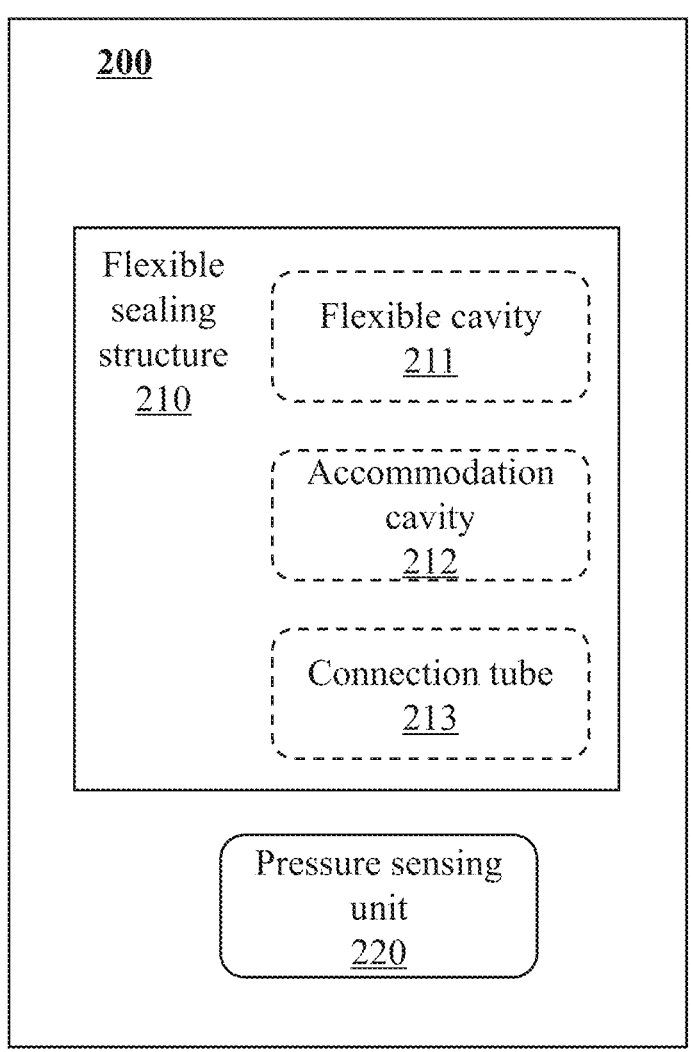
FIG. 2 is a block diagram illustrating an exemplary sensing device according to some embodiments of the present disclosure.

FIG. 2 is a block diagram illustrating an exemplary sensing device according to some embodiments of the present disclosure.

As shown in FIG. 2, a sensing device 200 may include a flexible sealing structure 21 and a pressure sensing unit 220.

The flexible sealing structure 210 may deform under an external load and produce a change in the pressure of the fluid. The flexible sealing structure 210 is provided at a joint of a user, and the flexible sealing structure 210 is filled with the fluid. Exemplary joints may include an elbow joint, a knee joint, a wrist joint, a finger joint (or a knuckle), a shoulder joint, an ankle joint, or the like. For example, the fluid may include gas (e.g., air, inert gas), liquid (e.g., water), a combination of gas and liquid (e.g., a combination of air and water), or the like. In some embodiments, the flexible sealing structure 210 may form a closed cavity. Under the external load, the flexible sealing structure 210 deforms to cause a change in a volume of the closed cavity, thereby causing a change in the pressure of the fluid within the closed cavity. Taking the application of the sensing device 200 to a wearable device as an example, when the sensing device 200 is located at a joint (e.g., a knuckle) of the wearable device, a bending action of the user's joint (e.g., a finger bending) may deform the flexible sealing structure 210 of the sensing device 200, to change the volume of the closed cavity, and thereby causing the change in the pressure of the fluid within the closed cavity. In some embodiments, the pressure sensing unit 220 may be disposed in the closed cavity formed by the flexible sealing structure 210, and the pressure sensing unit 220, in response to the change in the pressure of the fluid within the closed cavity, converts the change in the pressure of the fluid into an electrical signal. In some embodiments, the flexible sealing structure 210 and the pressure sensing unit 220 may be in fluid communication with each other. The fluid communication refers to that the change in the pressure of the fluid within the flexible sealing structure 210 can be received by the pressure sensing unit 220. In some embodiments, the flexible sealing structure 210 may deform and produce the change in the pressure of the fluid within the flexible sealing structure 210, and the pressure sensing unit 220 generates the electrical signal in response to the change in the pressure of the fluid within the flexible sealing structure 210. In some embodiments, the sensing device 200 may further include a processor, the processor may be connected to the pressure sensing unit 220, the processor receives the electrical signal generated by the pressure sensing unit 220, and recognizes a deformation state of the flexible sealing structure 210 based on the electrical signal.

The pressure sensing unit 220 may be a sensor for detecting the pressure of the fluid. The pressure sensing unit 220 may convert the change in the pressure of the fluid within the flexible sealing structure 210 into the electrical signal. For example, a thin film structure may be provided at an opening of the pressure sensing unit 220, and the change in the pressure of the fluid within the flexible sealing structure 210 causes the thin film structure to deform, thereby causing the change in the pressure of the fluid within the pressure sensing unit 220, and the pressure sensing unit 220 converts the change in the pressure of the fluid within the pressure sensing unit 220 into the electrical signal. In some embodiments, the pressure sensing unit 220 may include a sensing component (e.g., a MEMS sensor) and a thin film structure. One end of the sensing component may have an opening, and the thin film structure covers the opening. The change in the pressure of the fluid pressure within the flexible sealing structure 210 may make the thin film structure of the pressure sensing unit 220 deform, thereby causing the change in the pressure of the fluid within the sensing component, and the sensing component may convert the change in the pressure of the fluid into the electrical signal. In some embodiments, the pressure sensing unit 220 may be disposed inside the flexible sealing structure 210, and when an external load causes the flexible sealing structure 210 to deform, the external load may cause the change in the pressure of the fluid within the closed cavity formed inside the flexible sealing structure 210, and the pressure sensing unit 220 may convert the change in the pressure of the fluid into the electrical signal. By providing the pressure sensing unit 220 within the flexible sealing structure 210, on the one hand, the pressure sensing unit 220 can receive the change in the pressure of the fluid within the flexible sealing structure 210 to generate the electrical signal; on the other hand, the flexible sealing structure 210 can also play a protective role for the pressure sensing unit 220 and its internal components (e.g., the sensing component) to prevent the pressure sensing unit 220 and its internal components (e.g., the sensing component) from being damaged.

Figure 3:
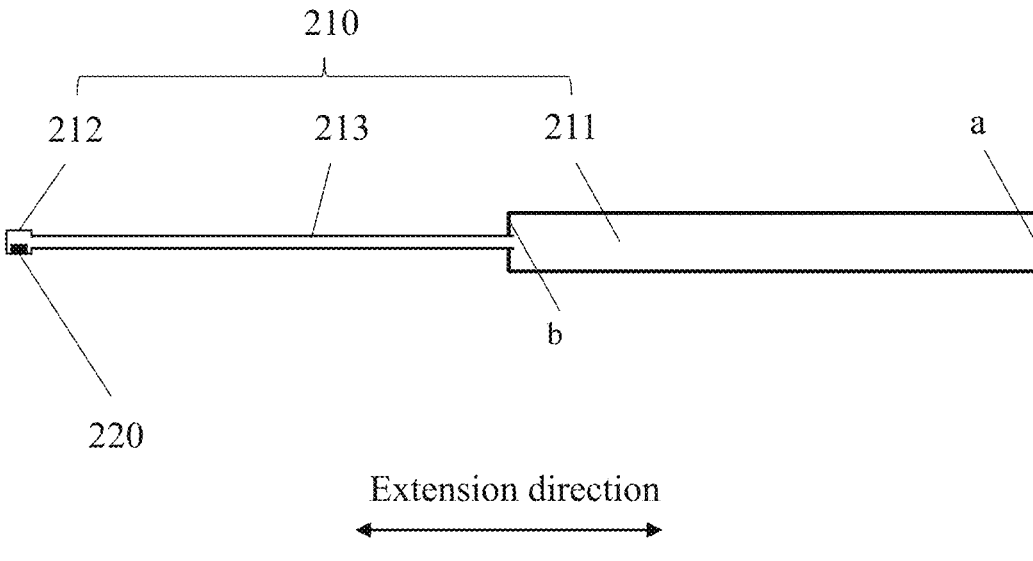
FIG. 3 is a schematic diagram illustrating an exemplary structure of a sensing device according to some embodiments of the present disclosure.

FIG. 3 is a schematic diagram illustrating an exemplary structure of a sensing device according to some embodiments of the present disclosure. As shown in FIG. 2 and FIG. 3, in some embodiments, the flexible sealing structure 210 may include the flexible cavity 211, an accommodation cavity 212, and a connection tube 213. The flexible cavity 211, the accommodation cavity 212, and the connection tube 213 may together form a closed cavity of the flexible sealing structure 210. The flexible cavity 211 may deform under an action of an external load and produce a change in the pressure of fluid, the accommodation cavity 212 may be used to accommodate the pressure sensing unit 220, and the connection tube 213 may be used to connect the flexible cavity 211 and the accommodation cavity 212. In some embodiments, one end of the connection tube 213 is in fluid communication with the flexible cavity 211, the other end of the connection tube 213 is in fluid communication with the accommodation cavity 212, and the change in the pressure of the fluid within the flexible cavity 211 may be transferred to the accommodation cavity 212 through the connection tube 213. In some embodiments, the external load may act on (or primarily act on) the flexible cavity 211 to cause the flexible cavity 211 to deform, resulting in the change in the pressure of the fluid within the flexible cavity 211. The change in the pressure of the fluid within the flexible cavity 211 is further transferred through the connection tube 213 into the accommodation cavity 212, so that the pressure sensing unit 220 may respond to the change in the pressure of the fluid within the flexible cavity 211 to generate the electrical signal.

In some embodiments, in order to ensure that the flexible cavity 211 can have a good deformation effect under the external load, a material of the flexible cavity 211 may be a material with good elasticity (i.e., susceptible to elastic deformation). In some embodiments, the material of the flexible cavity 211 may include a polymer material, a gum material, or the like. In some embodiments, the polymer material may be Polycarbonate (PC), Polyamides (PA), Acrylonitrile Butadiene Styrene (ABS), Polystyrene (PS), High Impact Polystyrene (HIPS), Polypropylene (PP), Polyethylene Terephthalate (PET), Polyvinyl Chloride (PVC), Polyurethanes (PU), Polyethylene (PE), Phenol-Formaldehyde (PF), Urea-Formaldehyde (UF), Melamine-Formaldehyde (MF), Polyarylate (PAR), Polyetherimide (PEI), Polyimide (PI), Polyethylene Naphthalate two formic acid glycol ester (PEN), Polyetheretherketone (PEEK), silica gel, etc., or a combination thereof.

In some embodiments, the connection tube 213 is used to connect the flexible cavity 211 and the accommodation cavity 212, and the change in the pressure of the fluid within the flexible cavity 211 may be transferred to the accommodation cavity 212 through the connection tube 213, causing the pressure sensing unit 220 to generate the electrical signal in respond to the change in the pressure of the fluid. In some embodiments, a relative position of the flexible cavity 211 and the pressure sensing unit 220 may be adjusted by setting a connection position of the connection tube 213 and the flexible cavity 211, such that the relative position of the flexible cavity 211 and the pressure sensing unit 220 may be flexibly arranged so that the sensing device 200 may be adapted to different application scenarios.

In some embodiments, the flexible cavity 211 and the connecting tube 213 may be made of the same or different material. In some embodiments, the external load acting on the flexible sealing structure 210 to deform the flexible cavity 211 may also deform the connection tube 213, and the deformation of the connection tube 213 may also result in a certain (smaller) degree of change in the pressure of the fluid, which may also be received by the pressure sensing unit 220 and converted the change into the electrical signal. Thus, in order to minimize the influence of the deformation of the connection tube 213 under the external load on the electrical signal, the Young's modulus of the flexible cavity 211 may be set to be less than the Young's modulus of the connection tube 213. In some embodiments, a ratio of the Young's modulus of the flexible cavity 211 to the Young's modulus of the connection tube 213 may be in a range of 1:1 to 1:10. In some embodiments, in order to minimize the influence of the deformation of the connection tube 213 under the external load on the electrical signal, the ratio of the Young's modulus of the flexible cavity 211 to the Young's modulus of the connection tube 213 may be in a range of 1:2 to 1:8.

In some embodiments, a structure of the flexible cavity 211 and/or the connection tube 213 may be a tubular structure and/or an airbag structure. The tubular structure may include, but is not limited to, a regular and/or an irregular geometric structure such as a square tube, a round tube, a vertebral tube, a curved tube, or the like. In some embodiments, dimensions (e.g., a length of the tubular structure, a tube diameter, etc.) of the flexible cavity 211 and/or the connection tube 213 may be reasonably set according to the actual application of the sensing device 200, e.g., a position of the sensing device 200 on a wearable device, and may not be further limited herein.

In some embodiments, in order to minimize the influence of the deformation of the connection tube 213 on the electrical signal, a tube diameter of the flexible cavity 211 may be set larger than a tube diameter of the connection tube 213. For example, when both the flexible cavity 211 and the connection tube 213 are round tubes, a diameter of an end surface of the flexible cavity 211 is larger than a diameter of an end surface of the connection tube 213. In some embodiments, a ratio of the tube diameter of the flexible cavity 211 to the tube diameter of the connection tube 213 may be greater than 2. In some embodiments, in order to minimize the influence of the deformation of the connection tube 213 on the electrical signal, the ratio of the tube diameter of the flexible cavity 211 to the tube diameter of the connection tube 213 may be greater than 3. Merely by way of example, the tube diameter (e.g., an inner diameter) of the connection tube 213 may be one-quarter of the tube diameter (e.g., an inner diameter) of the flexible cavity 211.

In some embodiments, the accommodation cavity 212 is used to accommodate the pressure sensing unit 220. The change in the pressure of the fluid within the flexible cavity 211 needs to be transferred to the accommodation cavity 212 through the connection tube 213, to produce the change in the pressure of the fluid within the accommodation cavity 212, and the pressure sensing unit 220 generates the electrical signal in response to the change in the pressure of the fluid within the accommodation cavity 212. As can be seen, a relationship between the change in the pressure of the fluid within the flexible cavity 211 and the change in the pressure of the fluid within the accommodation cavity 212 can affect the sensitivity of the pressure sensing unit 220. Again, from Equation (1) and Equation (2) above, it can be seen that for the fluid within the accommodation cavity 212 flexible cavity, the volume of the accommodation cavity 212 flexible cavity may be inversely proportional to the pressure of the fluid within the accommodation cavity 212 flexible cavity, or for the fluid within the flexible cavity 211, the volume of the flexible cavity 211 may be inversely proportional to the pressure of the fluid within flexible cavity 211. As can be seen, the relationship between the volume of the flexible cavity 211 and the volume of the accommodation cavity 212 can affect the sensitivity of the pressure sensing unit 220. Specifically, the smaller the volume of the accommodation cavity 212 is relative to the volume of the flexible cavity 211, the easier the change in the pressure of the fluid within the flexible cavity 211 causes the change in the pressure of the fluid within the accommodation cavity 212, and the higher the sensitivity of the pressure sensing unit 220 is. Thus, the sensitivity of the sensing device 200 may be adjusted (e.g., increased) by setting the volume of the accommodation cavity 212 and the volume of the flexible cavity 211. In some embodiments, the volume of the accommodation cavity 212 may be smaller than the volume of the flexible cavity 211 in order to increase the sensitivity of the sensing device 200. In some embodiments, in order to increase the sensitivity of the sensing device 200, a ratio of the volume of the accommodation cavity 212 to the volume of the flexible cavity 211 may not exceed 0.5. In some embodiments, to increase the sensitivity of the sensing device 200, the ratio of the volume of the accommodation cavity 212 to the volume of the flexible cavity 211 may not exceed 0.1.

In some embodiments, when the pressure sensing unit 220 is disposed within the accommodation cavity 212, the accommodation cavity 212 also protects the pressure sensing unit 220 and its internal components. In order to enable the accommodation cavity 212 to act as a support to protect the pressure sensing unit 220, the accommodation cavity 212 may be made of a material with a high degree of hardness (e.g., a metal, an alloy, etc.). The material of the accommodation cavity 212 may be reasonably set according to the actual situation (e.g., the position of the flexible sealing structure 210 on the wearable device), which is not limited herein. In some embodiments, the pressure sensing unit 220 may also be disposed in the flexible cavity 211.

Figure 4:
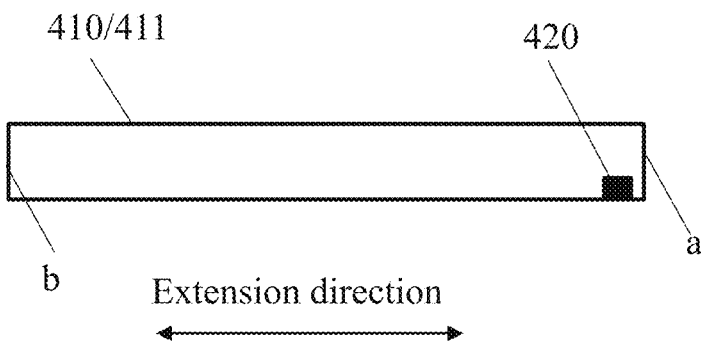
FIG. 4 is a schematic diagram illustrating an exemplary structure of another sensing device according to some embodiments of the present disclosure.

FIG. 4 is a schematic diagram illustrating an exemplary structure of another sensing device according to some embodiments of the present disclosure. A structure of a sensing device 400 shown in FIG. 4 is substantially the same as the structure of the sensing device 200 in FIG. 3 except that a flexible sealing structure 410 of the sensing device 400 has a different structure. As shown in FIG. 4, the flexible sealing structure 410 of the sensing device 400 includes a flexible cavity 411. The flexible cavity 411 may be a closed cavity. A pressure sensing unit 420 is disposed inside the flexible cavity 411. Under an action of an external load, the flexible cavity 411 deforms and produces a change in the pressure of fluid within the flexible cavity 411, and the pressure sensing unit 420 converts the change in the pressure of the fluid into an electrical signal. In some embodiments, the pressure sensing unit 420 may be located anywhere in the flexible cavity 411 (e.g., at an end, middle, or other positions). In some embodiments, taking into account that most of the stress positions of the flexible cavity 411 are non-end positions, in order to prevent the pressure sensing unit 420 from being damaged by extrusion during use, the pressure sensing unit 420 may be disposed at one end of the flexible cavity 411.

By providing the pressure sensing unit 420 inside the flexible cavity 411, the structure of the flexible sealing structure 410 may be simplified, while also avoiding the influence of the deformation of other structures (e.g., a connection tube) on the electrical signal.

Continuing with FIG. 4, in some embodiments, the flexible cavity 411 may have an extension direction. The extension direction may be an axial direction of the flexible cavity 411. The extension direction is parallel to a line connecting centers of the two end surfaces of the flexible cavity 411 (e.g., an end surface a and an end surface b shown in FIG.

4). In some embodiments, when the flexible cavity 411 is a non-uniform structure (e.g., a vertebral tubular structure), the external load acting on different positions of the flexible cavity 411 and making the flexible cavity 411 deformed at different positions may cause the flexible cavity 411 to produce different changes in the pressure of the fluid flexible cavity, in turn, cause the pressure sensing unit 420 to generate different electrical signals. The flexible cavity 411 being the non-uniform structure refers to that areas of cross-sections perpendicular to the extension direction at different positions of the flexible cavity 411 are different. For example, when the flexible cavity 411 is a vertebral tube-like structure, an area of a cross-section of the vertebral tube-like structure perpendicular to the extension direction gradually increases (or decreases) from one end of the vertebral tube-like structure to the other end of the vertebral tube-like structure. In some embodiments, in order to ensure that the pressure sensing unit 420 can generate substantially same electrical signals when the external load is applied to different positions of the flexible cavity 411, the flexible cavity 411 may be set up as a uniform structure, i.e., a change in the area of the cross-section of the flexible cavity 411 perpendicular to the extension direction is within a suitable range. In some embodiments, in order to ensure that the pressure sensing unit 420 generates the same or approximately same electrical signals when the external load is applied to different positions of the flexible cavity 411, the change in the area of the cross-section of the flexible cavity 411 perpendicular to the extension direction does not exceed 20%. For example, in order to ensure that the pressure sensing unit 420 generates the same or approximately same electrical signals when the external load is applied to different positions of the flexible cavity 411, the change in the area of the cross-section of the flexible cavity 411 perpendicular to the extension direction does not exceed 10%. In some embodiments, when the flexible cavity 411 is provided at a joint of a wearable device to measure an action and a posture of the joint (e.g., a bending angle of the joint), a user may wear the wearable device with an offset, i.e., the joint of the wearable device does not match or match a joint of the human body to a high degree. In this case, by setting the flexible cavity 411 into a uniform structure, the influence on the measurement of the action and the posture of the joint when there is a difference in the position of the external load action can be reduced, to ensure the accuracy of a measurement result. In some alternative embodiments, it is also possible to set the flexible cavity 411 into a non-uniform structure, so that when the external load is applied to different positions of the flexible cavity 411, the pressure sensing unit 420 may generate different electrical signals, thereby recognizing a deformation position of the flexible cavity 411 based on the electrical signals.

In some embodiments, the sensing device 200 or the sensing device 400 may include a processor (not shown in the figures). Illustrated with the sensing device 200 as an example, the processor may recognize a deformation state of the flexible sealing structure 210 based on the electrical signal. The deformation state of the flexible sealing structure 210 refers to a change in a structural parameter of the flexible sealing structure 210 caused by the action of the external load. For example, the external load acting on the flexible sealing structure 210 causes the flexible sealing structure 210 to bend and deform at a stress position. In some embodiments, the deformation state of the flexible sealing structure 210 may include a bending angle. The bending angle may be an angle at which a portion of the flexible sealing structure 210 that undergoes the bending is turned around a rotary axis. Taking the application of the sensing device 200 to a wearable device as an example, the flexible sealing structure 210 is affixed to a joint, and the user's joint movement, such as the joint bending, may cause the flexible sealing structure 210 to bend, and the greater the bending angle, the greater the bending angle of the flexible sealing structure 210.

In some embodiments, the processor may recognize the deformation state, e.g., the bending angle, of the flexible sealing structure 210 by retrieving a table. In some embodiments, the deformation state of the flexible sealing structure 210 may be recognized based on a preset correspondence relationship table and an electrical signal. The correspondence relationship table may reflect a correspondence relationship between the electrical signal and the deformation state of the flexible sealing structure 210. In some embodiments, the correspondence relationship table may be a correspondence relationship table between preset electrical signals and bending angles of the flexible sealing structure 210. After the pressure sensing unit 220 generates an electrical signal, a bending angle corresponding to the electrical signal can be found in the preset correspondence relationship table based on the electrical signal. In some embodiments, the preset correspondence relationship table may be obtained by testing.

In some embodiments, the processor may recognize the deformation state, e.g., the bending angle, of the flexible sealing structure 210 based on a machine learning model. An input of the machine learning model may be the electrical signal. An output of the machine learning model may be the bending angle of the flexible sealing structure 210. The machine learning model may be obtained by training an initial machine learning model (e.g., a neural network model) based on training samples. In some embodiments, a training sample may include a sample electrical signal parameter and a training label. The training label may be the bending angle of the flexible sealing structure 210. In some embodiments, the training label may be obtained from historical experimental data or may be obtained by manual labeling. In some embodiments, the machine learning model may include a deep neural network (DNN) model or a convolutional neural network (CNN) model.

Figure 5:
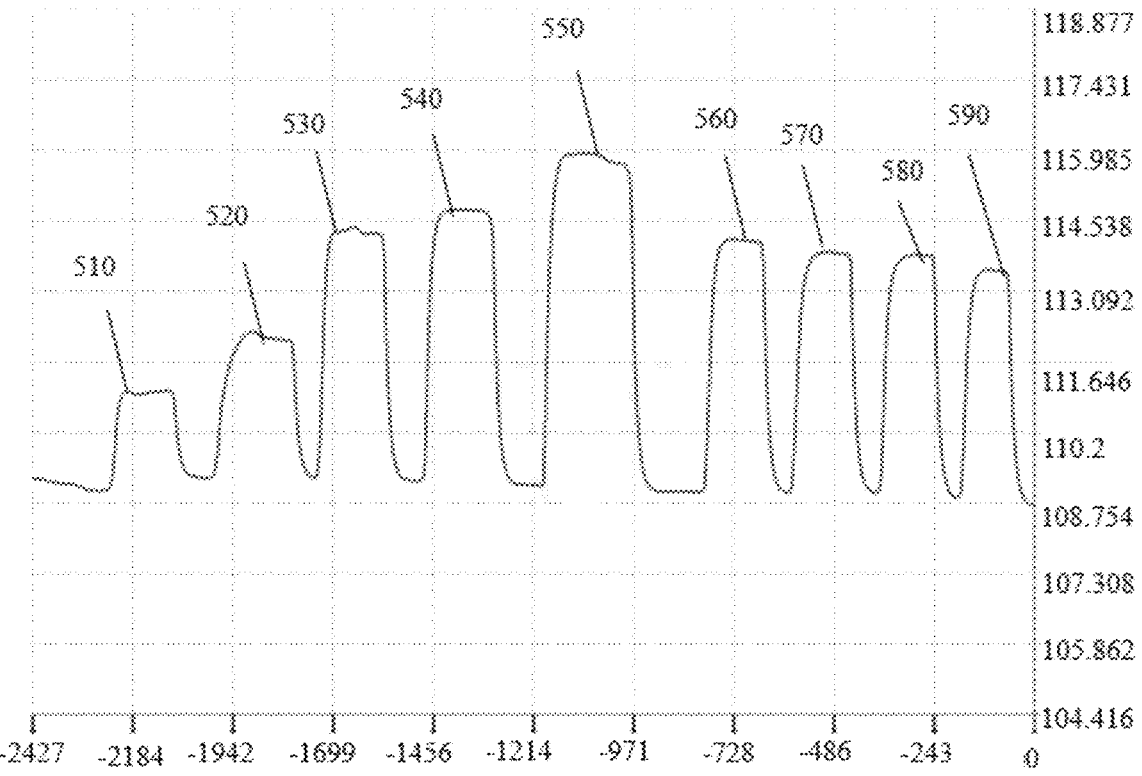
FIG. 5 is a graph illustrating a barometric curve of a sensing device under different conditions according to some embodiments of the present disclosure.

FIG. 5 is a graph illustrating a barometric curve of a sensing device under different conditions according to some embodiments of the present disclosure. In some embodiments, a flexible sealing structure (e.g., the flexible sealing structure 210) undergoes different degrees of deformation. Take the fluid as air and the pressure sensing unit as a barometric pressure sensor for example, when a bending angle is different, different barometric pressures are produced within a flexible cavity, and the pressure sensing unit detects the different barometric pressures. That is to say, there may be a certain relationship between the barometric pressure of the pressure sensing unit and the bending angle of the flexible sealing structure. As shown in FIG. 5, where a horizontal axis represents a time in ms that an external load is applied to the flexible sealing structure, and a vertical axis represents the biometric pressure value in kPa of the pressure sensing unit. As can be seen in FIG. 5, a barometric curve illustrates nine rectangular peaks 510-590. The rectangular peak 510, the rectangular peak 520, the rectangular peak 530, the rectangular peak 540, and the rectangular peak 550 denote barometric pressures of the pressure sensing unit of the flexible sealing structure at different bending angles, and bending angles of the flexible sealing structure corresponding to the rectangular peak 510, the rectangular peak 520, the rectangular peak 530, the rectangular peak 540, and the rectangular peak 550 gradually increase. Comparing the rectangular peak 510, the rectangular peak 520, the rectangular peak 530, the rectangular peak 540, and the rectangular peak 550, it can be seen that there is an approximately linear relationship between the bending angle of the flexible sealing structure and the barometric pressure of the pressure sensing unit. The larger the bending angle of the flexible sealing structure, the larger the barometric pressure of the pressure sensing unit; the smaller the bending angle of the flexible sealing structure, the smaller the barometric pressure of the pressure sensing unit.

In some embodiments, a bending position of the flexible sealing structure has a small (or even negligible) effect on the barometric pressure of the pressure sensing unit when the bending angle is the same. Referring to FIG. 5, the rectangular peak 560, the rectangular peak 570, the rectangular peak 580, and the rectangular peak 590 indicate barometric pressures of the pressure sensing unit when bending of the flexible sealing structure occurs at different positions under the condition that the bending angle is the same. Only as an exemplary illustration, the rectangular peak 560, the rectangular peak 570, the rectangular peak 580, and the rectangular peak 590 correspond to bending positions of the flexible sealing structure that are progressively farther away from the pressure sensing unit. Comparing the rectangular peak 560, the rectangular peak 570, the rectangular peak 580, and the rectangular peak 590, it can be seen that under the condition of the same bending angle, when the flexible sealing structure is bent at different positions, the barometric pressures of the pressure sensing unit are basically the same. It can thus be shown that by a specific design of the flexible sealing structure (e.g., by setting the flexible cavity as a uniform structure), the barometric pressure of the pressure sensing unit is not affected by the bending position of the flexible sealing structure, i.e., the sensing device is not sensitive to the bending position. In recognizing the bending angle of the flexible sealing structure, the insensitivity of the sensing device to the bending position can reduce the impact on a recognition result when there is a difference in the bending position, thus ensuring the accuracy of the recognition result.

It should be noted that the reason why the barometric curve shown in FIG. 5 shows a rectangular peak may be as follows. A bending angle of the flexible sealing structure in an initial state is about 0 degrees, and then, an external force causes the bending angle of the flexible sealing structure to change from 0 degrees to $\alpha_1$, during which the barometric pressure of the pressure sensing unit increases, and the barometric curve of the pressure sensing unit corresponds to a rising edge of the rectangular peak 510; the external force continues for a period to maintain the bending angle of the flexible sealing structure at $\alpha_1$, during which the barometric pressure of the pressure sensing unit remains basically unchanged, and the barometric curve of the pressure sensing unit corresponds to a high level of the rectangular peak 510; the external force is withdrawn, and the flexible sealing structure returns to the initial state, that is, the bending angle of the flexible sealing structure changes from $\alpha_1$ to 0, during which the barometric pressure of the pressure sensing unit decreases, and the barometric curve of the pressure sensing unit corresponds to a falling edge of the rectangular peak 510. In the same manner, the bending angles of the flexible sealing structure are $\alpha_2$, $\alpha_3$, $\alpha_4$, and $\alpha_5$, where $\alpha_1 < \beta_2 < \alpha_3 < \alpha_4 < \alpha_5$ (and $\alpha_1$ to $\alpha_5$ may be approximately linearly varying), then the rectangular peak 520, the rectangular peak 530, the rectangular peak 540, and the rectangular peak 550 illustrated in FIG. 5 may be obtained. Using a similar manner, when measuring the effect of the bending position of the flexible sealing structure on the barometric pressure of the pressure sensing unit under the condition that the bending angle is the same, the rectangular peak 560, the rectangular peak 570, the rectangular peak 580 and the rectangular peak 590 may be obtained.

The present disclosure provides a wearable device, comprising: a wearing body, at least one sensing device provided on the wearing body, and a processor. The at least one sensing device includes a flexible sealing structure provided at a joint of a user and a pressure sensing unit. The flexible sealing structure is filled with fluid inside. The pressure sensing unit is in fluid communication with the flexible sealing structure, a pressure of the fluid inside the flexible sealing structure changes in response to a deformation of the joint of the user, and the pressure sensing unit converts a change in the pressure of the fluid into an electrical signal. The processor is configured to recognize a bending angle of the joint of the user based on the electrical signal.

The sensing device provided in embodiments of the present disclosure may be applied to detecting and simulating the movement of a joint of the human body. In some embodiments, the joint may include but is not limited to, one or more of an elbow joint, a knee joint, a wrist joint, a knuckle (or a knuckle), a shoulder joint, an ankle joint, or the like. In some embodiments, the sensing device may be applied to the wearing body. Exemplary wearing bodies include a glove, a wrist guard, an elbow pad, a shoulder pad, a knee pad, a sock, etc. Exemplary movement detection may include measurement of whether a joint is in movement, measurement of a movement angle of the joint, measurement of a movement posture, or the like. Exemplary applications of the sensing device to the glove, the elbow pad, or the like, are described below.

Figure 6:
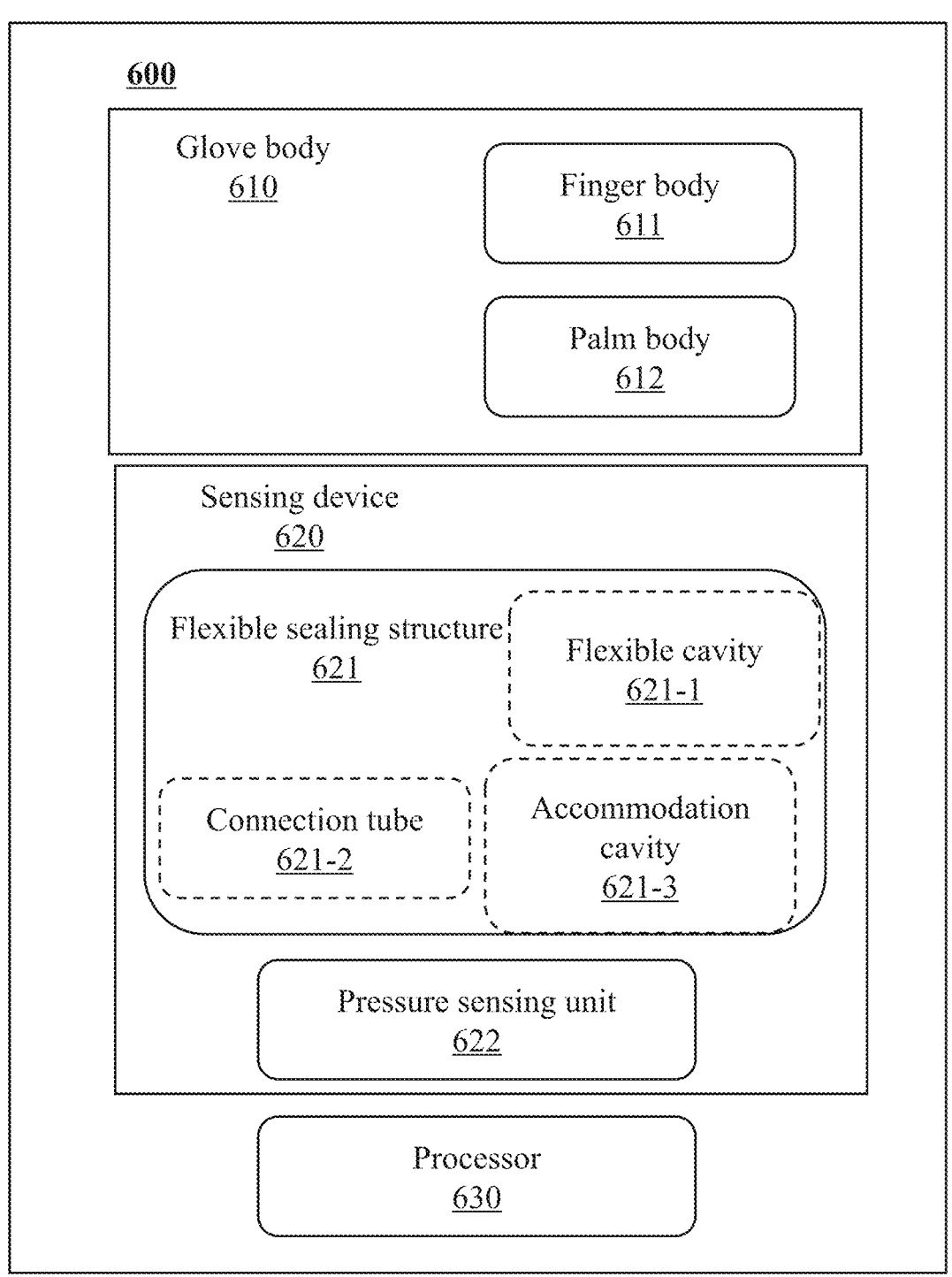
FIG. 6 is a block diagram illustrating an exemplary glove according to some embodiments of the present disclosure.

The sensing device provided in embodiments of the present disclosure may be applied to a glove for capturing a hand action. FIG. 6 is a block diagram illustrating an exemplary glove according to some embodiments of the present disclosure.

As shown in FIG. 6, a glove 600 may include a glove body 610, at least one sensing device 620, and a processor 630. In some embodiments, the glove 600 may be used for capturing a hand action of a user, for example, capturing movement of each knuckle.

The glove body 610 may be used to secure the at least one sensing device 620. For example, the glove body 610 may include a structure such as a sandwich, a mesh pocket, or the like, for accommodating the sensing device 620, or secure the sensing device 620 by a structure such as a Velcro, a snap, or the like. In some embodiments, the glove body 610 may be used to accommodate fingers, palms, and various joints of the hand of the user. In some embodiments, the glove body 610 may include an elastic material to enable load transfer between the various joints of the hand, the glove body 610, and the sensing device 620. Exemplary elastic materials may include cotton, hemp, nylon, rubber, or the like. The glove body 610 may be a textile structure, and pores of the textile structure allow for breathability and perspiration. A contact surface of the glove body 610 with the various joints of the hand and the skin of the human body may be a breathable and skin-friendly material to improve the wearing experience of the user. In some embodiments, the sensing device 620 may be disposed outside of the glove body 610, and the glove body 610 serves to secure the sensing device 620 and for load transfer. In some embodiments, the sensing device 620 may be provided inside the glove body 610, when there is direct contact between the various joints of the hand and the sensing device 620, and the glove body 610 serves as a fixation protection. In some embodiments, the glove body 610 may include a finger body 611 and a palm body 612. The finger body 611 may be used to accommodate fingers and fix a flexible cavity 621-1 of the sensing device 620. The palm body 612 may be used to accommodate the palm and a connection tube 621-2 and an accommodation cavity 621-3 that accommodates the sensing device 620. In some embodiments, the processor 630 may be disposed at the palm body 612 or independently with respect to the glove body 610, e.g., the processor 630 may be integrated into a terminal device (e.g., a cell phone, a computer, a smartwatch), and the terminal device and the glove may be communicatively connected to each other by wired or wireless means.

The sensing device 620 may be any of the sensing devices in FIG. 3 and FIG. 4. In some embodiments, the sensing device 620 may include a flexible sealing structure 621 and a pressure sensing unit 622. The flexible sealing structure 621 may deform and produce a change in the pressure of fluid within the flexible sealing structure 621 in response to loads generated by various joints of the user's hand. The flexible sealing structure 621 may be disposed at a knuckle of the user, and the interior of the flexible sealing structure 621 is filled with the fluid. Exemplary fluid may include air, inert gas, water, etc. In some embodiments, the flexible sealing structure 621 may form a closed cavity. Under an action of a load generated by the movement of the knuckle of the user, the deformation of the flexible sealing structure 621 causes a change in a volume of the closed cavity, which causes a change in the pressure of the fluid within the closed cavity. In some embodiments, the flexible sealing structure 621 may include the flexible cavity 621-1, the connection tube 621-2, and the accommodation cavity 621-3. The flexible cavity 621-1, the connection tube 621-2 and the accommodation cavity 621-3 may collectively form the closed cavity of the flexible sealing structure 621. The flexible cavity 621-1 may deform under the load generated by the user's knuckle and produce the change in the pressure of the fluid, the accommodation cavity 621-3 may be used to accommodate the pressure sensing unit 622, the connection tube 621-2 is used to connect the flexible cavity 621-1 and the accommodation cavity 621-3. In some embodiments, one end of the connection tube 621-2 is in fluid communication with the flexible cavity 621-1, and the other end of the connection tube 621-2 is in fluid communication with the accommodation cavity 621-3, and the change in the pressure of the fluid within the flexible cavity 621-1 may be transferred to the accommodation cavity 621-3 through the connection tube 621-2. In some embodiments, the load generated by the knuckle of the user may act on (or primarily act on) the flexible cavity 621-1, causing the flexible cavity 621-1 to deform, which can result in the change in the pressure of the fluid within the flexible cavity 621-1. The change in the pressure of the fluid within the flexible cavity 621-1 is further transferred through the connection tube 621-2 into the accommodation cavity 621-3 to the pressure sensing unit 622, so that the pressure sensing unit 633 generates an electrical signal in response to the change in the pressure of the fluid within the flexible cavity 621-1.

The pressure sensing unit 622 may be a sensor for detecting the pressure of fluid. The pressure sensing unit 622 may convert the change in the pressure of the fluid within flexible sealing structure 621 into the electrical signal. For example, a thin film structure may be provided at an air inlet hole of the pressure sensing unit 622, and the change in the pressure of the fluid within the flexible sealing structure 621 deforms the thin film structure, thereby causing the pressure of the fluid within the pressure sensing unit 622 to change, then the pressure sensing unit 622 converts the change in the pressure of the fluid within the pressure sensing unit 622 into the electrical signal. In some embodiments, the pressure sensing unit 622 may include a sensing component (e.g., a MEMS sensor) and a thin film structure. One end of the sensing component may have an opening, with the thin film structure covering the opening. The change in the pressure of the fluid within the flexible sealing structure 621 may deform the thin film structure of the pressure sensing unit 622, thereby causing the change in the pressure of the fluid within the sensing component, and the sensing component may convert the change in the pressure of the fluid into the electrical signal.

The processor 630 may be configured to recognize a hand action of the user based on the electrical signal. The processor 630 may recognize a deformation state of the flexible scaling structure 621 based on the electrical signal. In some embodiments, the processor may recognize the deformation state of the flexible sealing structure 621 by retrieving a table. In some embodiments, the deformation state of the flexible sealing structure 621 may be recognized based on a preset correspondence relationship table and the electrical signal. The correspondence relationship table may reflect a correspondence relationship between the electrical signal and the deformation state of the flexible sealing structure 621. In some embodiments, the correspondence relationship table may be a correspondence relationship table between preset electrical signals and bending angles of the flexible sealing structure 621. After the pressure sensing unit 622 generates the electrical signal, a bending angle corresponding to the electrical signal can be found in the preset correspondence relationship table based on the electrical signal. In some embodiments, the preset correspondence relationship table may be obtained by way of testing. In some embodiments, the processor may recognize the deformation state of the flexible sealing structure 621 based on a machine learning model, and an input of the machine learning model may be the electrical signal. An output of the machine learning model may be the bending angle of the flexible sealing structure 621. The machine learning model may be obtained by training an initial machine learning model (e.g., a neural network model) based on training samples. In some embodiments, a training sample may include a sample electrical signal parameter and a training label. The training label may be the bending angle of the flexible sealing structure 621. In some embodiments, the training label may be obtained from historical experimental data or may be obtained by manual labeling. In some embodiments, the machine learning model may include a deep neural network (DNN) model or a convolutional neural network (CNN) model. In some embodiments, the hand action of the user may be determined by setting up a sensing device at each knuckle in a glove to obtain a deformation state of the sensing device corresponding to each knuckle.

Figure 7A:
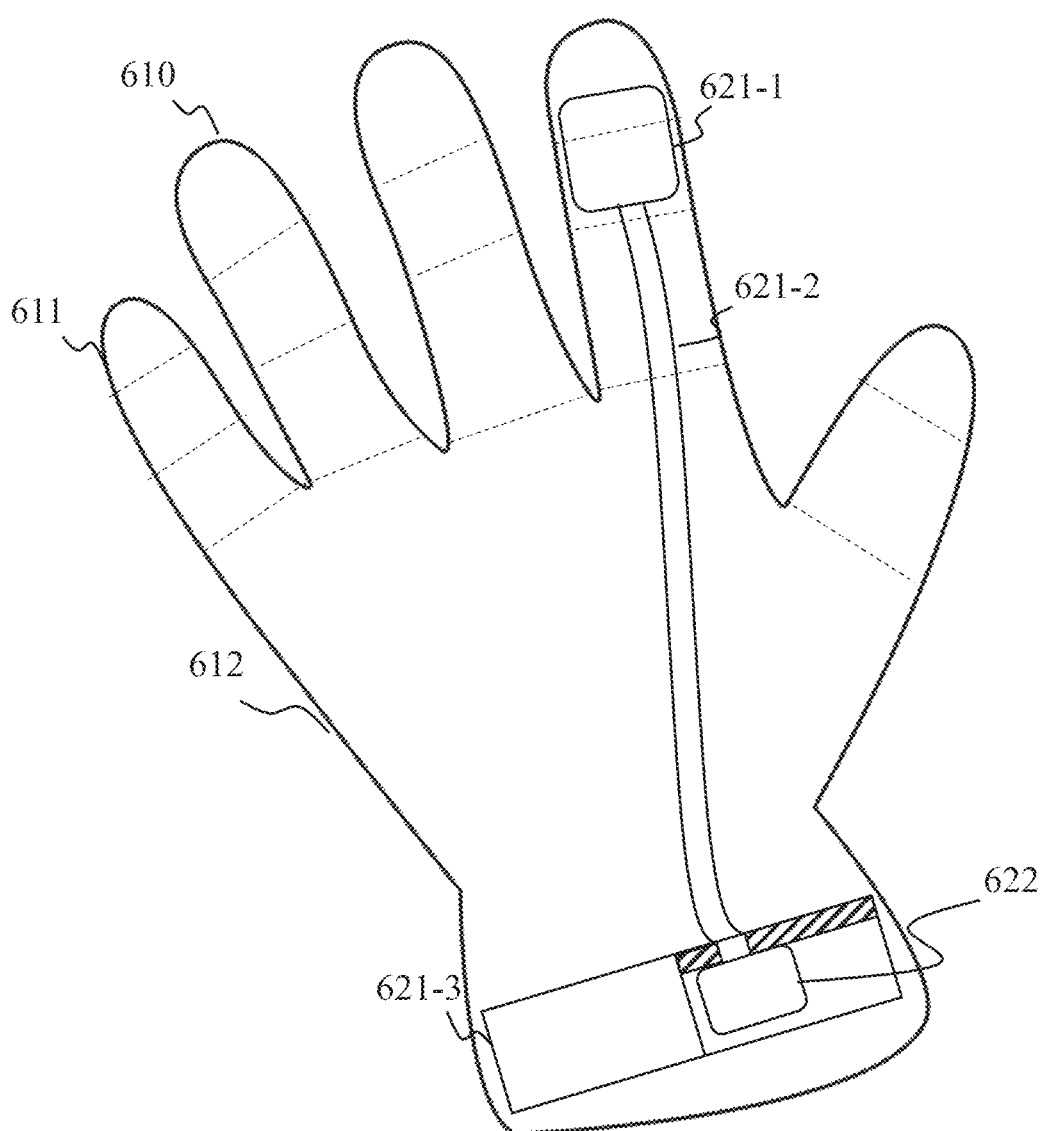
FIG. 7A is a schematic diagram illustrating an exemplary structure of a glove according to some embodiments of the present disclosure.

A structure of components of the glove 600 in FIG. 6 can be referred to FIG. 7A. FIG. 7A is a schematic diagram illustrating an exemplary structure of a glove for capturing a hand action according to some embodiments of the present disclosure.

In some embodiments, at least one knuckle of each finger of a user corresponds to a flexible sealing structure when the user is wearing the glove. FIG. 7A shows a flexible sealing structure corresponding to one knuckle. As shown in FIG. 7A, one palm of the user may generally include 14 knuckles (the knuckles are indicated by dotted lines in the figure), and any one or more of the above knuckles may correspond to at least one flexible sealing structure. It should be noted that, under the principle of a sensing device provided in the present disclosure, that one, more, or all knuckles correspond to a flexible sealing structure, and that other human body structures correspond to flexible sealing structures are all within the present disclosure. In some embodiments, when the user wears the glove, a flexible sealing structure is provided at each knuckle of each finger of the user. Each of the flexible sealing structures may sense a change in pressure at a corresponding knuckle, and by sensing a pressure at each joint of the hand, capturing the hand action is realized.

In order to facilitate cleaning of the glove as well as maintenance and replacement of the flexible sealing structure, in some embodiments, the flexible sealing structure may be removably coupled to a glove body. For example, the flexible sealing structure and the glove body are affixed via Velcro. For example, the flexible sealing structure and the glove body are removably connected via a buckle. In some embodiments, the flexible sealing structure may be disposed inside or outside of the glove body. FIG. 7A shows an example when the flexible sealing structure is located on the outside of the glove body. In some embodiments, the flexible sealing structure may be secured to the inside or outside of the glove body by means of a sandwich, a Velcro, a snap, a mesh pocket, a textile preparation, or the like. In some embodiments, the flexible sealing structure may be disposed on a palm side or a dorsal side of the hand of the glove body. In some embodiments, an initial shape of a flexible cavity may be a shape when the knuckle is straight (i.e., the finger is fully extended), and when the finger is bent, the flexible cavity deforms with the bending of the finger, and a change in the pressure of fluid inside the flexible cavity is generated. It will be appreciated that the flexible sealing structure disposed on the inside of the glove body is in a similar manner to FIG. 7A, and will not be described herein.

Figure 7B:
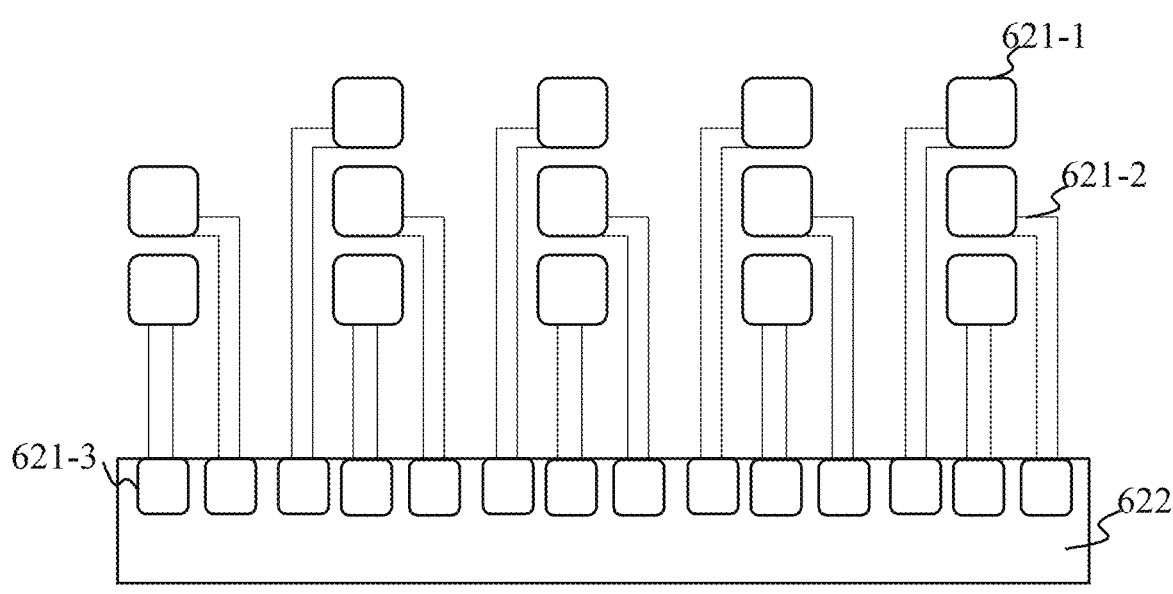
FIG. 7B is a schematic diagram illustrating an exemplary structure of a flexible sealing structure of a glove according to some embodiments of the present disclosure.

In some embodiments, the flexible cavity is provided at a knuckle of a finger body, and a connection tube extends from the finger body toward a palm body. As shown in FIG. 7A, the flexible cavity may be provided at each knuckle of the finger body (as shown by a dotted line in FIG. 7A), and the connection tube may be in fluid communication with the flexible cavity and an accommodation cavity, and the connection tube extends from the finger body toward the palm body. In some embodiments, each of the flexible cavities may correspond to a knuckle. In order to ensure that the flexible cavity may be precisely deformed in response to the movement of the knuckle, and to improve the accuracy of the glove to the user's hand action, in some embodiments, each flexible cavity may cover one knuckle. When the sensing device is applied to the glove, a size of the flexible cavity needs to be adapted accordingly to a size of the knuckle, and in some embodiments, a length of the flexible cavity may be in a range of 20 mm to 70 mm, and a width of the flexible cavity may be in a range of 6 mm to 40 mm. In some embodiments, and a thickness of the flexible cavity may be in a range of 1 mm to 5 mm. Preferably, the length of the flexible cavity may be in a range of 30 mm to 60 mm, the width of the flexible cavity may be in a range of 10 mm to 30 mm, and the thickness of the flexible cavity may be in a range of 2 mm to 4 mm. Specifically, the size of the flexible cavity may be 50 mm*20 mm*2 mm (length*width*thickness). The sensitivity of the sensing device in the glove is related to dimensions (e.g., diameters, volumes, etc.) and parameters of materials (e.g., the Young's modulus) of the flexible cavity and the connection tube. In some embodiments, when the flexible cavity and the connection tube are cylindrical pipes, a diameter (e.g., an inner diameter) of the flexible cavity is greater than a diameter (e.g., an inner diameter) of the connection tube. Preferably, a ratio of the diameter of the flexible cavity to the diameter of the connection tube is greater than 2. In some embodiments, a cross-sectional area of a side of the flexible cavity connected to the connection tube is greater than a cross-sectional area of the connection tube along a direction perpendicular to its own length. Preferably, the ratio of the cross-sectional area of the side of the flexible cavity connected to the connection tube to the cross-sectional area of the connection tube along the direction perpendicular to its own length is greater than 4. When the flexible cavity or the connection tube is not a cylindrical structure, a volume of the flexible cavity is greater than a volume of the connection tube. Preferably, the ratio of the volume of the flexible cavity to the volume of the connection tube is greater than 4. In some embodiments, the Young's modulus of the flexible cavity is less than the Young's modulus of the connection tube. Preferably, the ratio of the Young's modulus of the flexible cavity to the Young's modulus of the connection tube is in a range of 1:1 to 1:10. It should be noted that the dimension of the flexible cavity (e.g., a length or a width) may be adjusted to a size of the user's finger. FIG. 7B is a schematic diagram illustrating an exemplary structure of a flexible sealing structure of a glove according to some embodiments of the present disclosure. As shown in FIG. 7B, a glove 600 may include a plurality of sensing devices, and each of the plurality of sensing devices further includes a flexible sealing structure and a pressure sensing unit. In some embodiments, the glove 600 may include 14 sensing devices, each of the 14 sensing devices has a flexible cavity disposed at one knuckle of a finger body, respectively. For example, flexible cavities 621-1 of the sensing device are located at a metacarpophalangeal joint of a thumb, an interphalangeal joint of the thumb, a metacarpophalangeal joint of an index finger, a proximal interphalangeal joint of the index finger, a distal interphalangeal joint of the index finger, a metacarpophalangeal joint of a middle finger, a proximal interphalangeal joint of the middle finger, a distal interphalangeal joint of the middle finger, a metacarpophalangeal joint of a ring finger, a proximal interphalangeal joint of the ring finger, a distal interphalangeal joint of the ring finger, a metacarpophalangeal joint of a little finger, a proximal interphalangeal joint of the little finger, and a distal interphalangeal joint of the little finger, respectively. The above-described flexible cavities 621-1 are configured to deform in response to the movement of corresponding knuckles. A connection tube 621-2 extends from the finger body toward a palm body for realizing fluid communication between a corresponding flexible cavity 621-1 and an accommodation cavity 621-3. The accommodation cavity 621-3 may accommodate 14 pressure sensing units and is sealedly connected to pressure sensing units, and each of the pressure sensing units is electrically connected to a circuit board. It should be noted that the above sensing devices are for illustrative purposes only and are not intended to be a limitation of a count of sensing units. For example, the glove 600 may include only 3 sensing devices for monitoring an action of a single finger.

In some embodiments, when the sensing device is a structure as shown in FIG. 4, the flexible sealing structure includes only a flexible cavity, and the pressure sensing unit is disposed within the flexible cavity, which is provided at a knuckle of the finger body. In some embodiments, the pressure sensing unit may be communicatively connected to a processor by wired or wireless means, and the pressure sensing unit may transmit a generated electrical signal to the processor by wired or wireless means. The connection tube and the accommodation cavity may be eliminated by the above structure, which further saves space in the glove, and at the same time simplifies the structure of the glove and reduces the cost of production of the glove.

In some embodiments, the flexible cavity has an extension direction, and a change in an area of a cross-section of the flexible cavity perpendicular to the extension direction does not exceed 20%. For further description of the extension direction of the flexible cavity, please refer to FIG. 4 and its related description.

In some embodiments, the glove further includes the circuit board. The circuit board is disposed on a dorsal side of the hand of the palm body, and the pressure sensing unit is electrically connected to the circuit board. For example, an end of the pressure sensing unit that receives the change in the pressure of the fluid is disposed in the flexible sealing structure, and an output end of the pressure sensing unit is electrically connected to the circuit board. When the circuit board is located on the dorsal side of the hand of the palm body, the circuit board does not affect the user's action when the user makes a first or bends fingers, and also improves the wearing experience of the user. In some embodiments, the circuit board may be secured to a glove body by means of Velcro, snaps, mesh pockets, textile weaving, or the like. In some embodiments, the glove body may be a multilayer structure, and the circuit board may be disposed in a sandwich of the multilayer structure in the glove body. In some embodiments, the circuit board may be a flexible circuit board, and the flexible circuit board may deform with the movement of the user's hand, thereby ensuring the consistency of the flexible circuit board with the movement of the user's hand and further ensuring the user's wearable experience.

Figure 8:
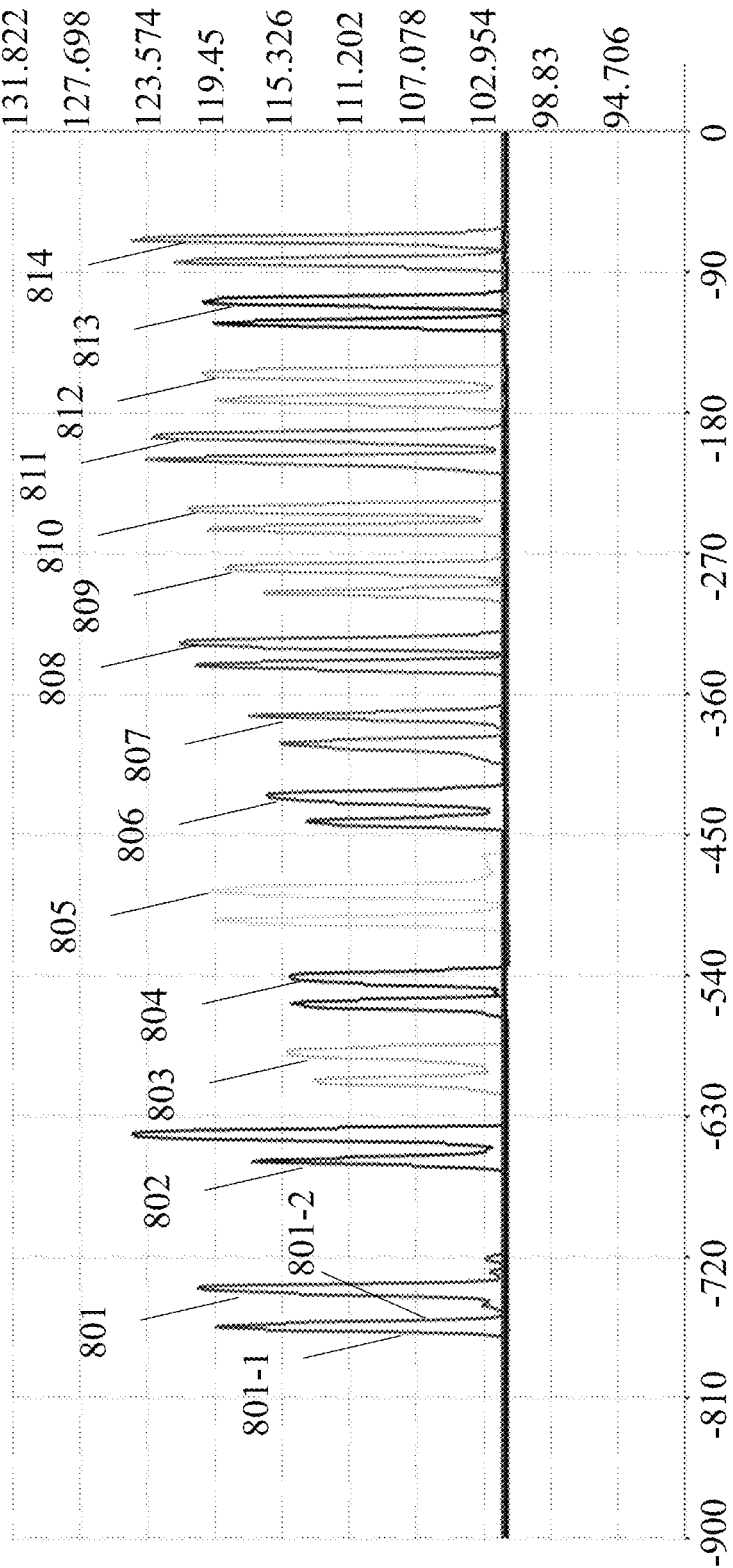
FIG. 8 is a graph illustrating a barometric curve of a sensing device of a glove according to some embodiments of the present disclosure.

FIG. 8 is a diagram illustrating a barometric curve of a sensing device of a glove according to some embodiments of the present disclosure. As shown in FIG. 8, when knuckles of a user's hand (e.g., in general, a human hand has 14 knuckles) perform two grasping actions, a change in the barometric pressure of each flexible sealing structure is measured, the knuckles are bent at different bending angles, and barometric curves 801, 802, 803, 804, 805, 806, 807, 808, 809, 810, 811, 812, 813, and 814 corresponding to the knuckles are obtained. A horizontal axis represents a time in ms for an external load to act on the flexible sealing structure, and a vertical axis represents a barometric pressure of the pressure sensing unit in kPa. As shown in FIG. 8, for the barometric curve 801, when the user's hand performs a grasping action, the user's hand starts to bend from an extended state until it grasps an object, a barometric pressure inside a flexible sealing structure is gradually strengthened as a bending angle of the knuckle increases, which corresponds to a rising section of a first peak of the barometric curve 801 (i.e., a curve 801-1); when the user performing a releasing action on the object until the hand is extended, the bending angle of the knuckle gradually decreases, which corresponds to a falling section of the first peak of the barometric curve 801 (i.e., a curve 801-2). Similarly, a second peak in the barometric curve 801 indicates that the user's hand again performs the grasping action and the releasing action described above. More descriptions of the barometric curves 802, 803, 804, 805, 806, 807, 808, 809, 810, 811, 812, 813, and 814 may be referred to the barometric curve 801. It will be appreciated that the greater the bending angle, the greater the barometric pressure inside the flexible sealing structure, the greater the peak value of the corresponding barometric curve. For example, the barometric curves 803, 804, 806, and 807 have relatively small peaks, which may correspond to knuckles with relatively small bending angles. For example, the four barometric pressure curves described above with relatively small peaks may correspond to interphalangeal distal joints of an index finger, a middle finger, a ring finger, and a little finger, which have relatively fewer movements. The barometric curves 801, 802, 811, and 814 with relatively large peaks may correspond to metacarpophalangeal joints of the index finger, the middle finger, the ring finger, and the little finger, which have relatively large movements. It should be noted that there are individual differences between different users, and FIG. 8 only illustrates a correspondence relationship between each knuckle and a corresponding barometric curve, and is not intended to qualify a specific knuckle.

Figure 9:
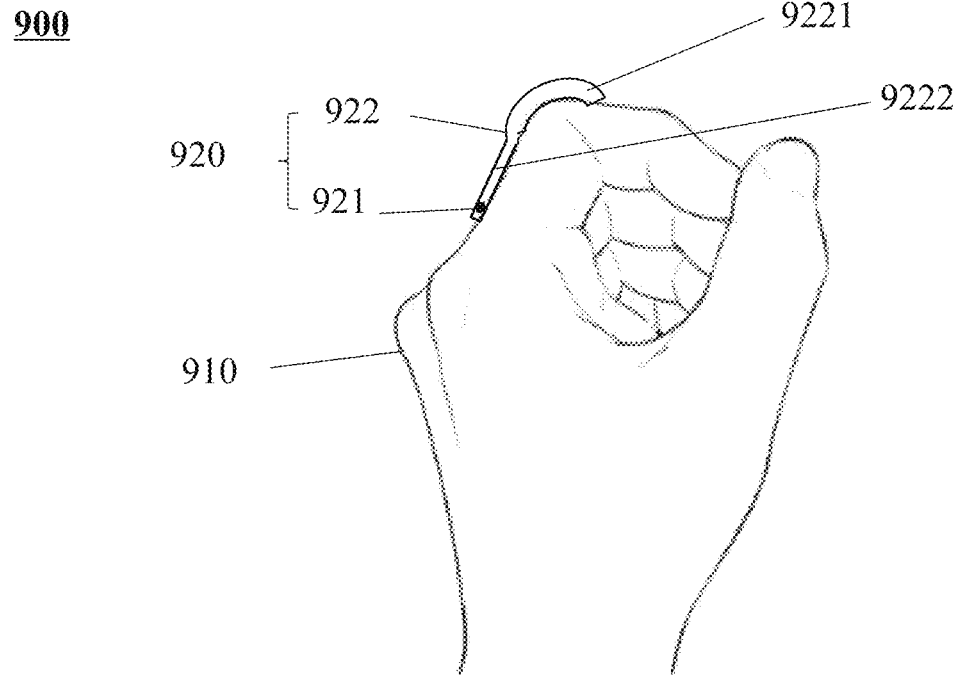
FIG. 9 is a diagram illustrating wearing a posture sensor according to some embodiments of the present disclosure.

The sensing device provided in embodiments of the present disclosure may be used for a posture sensor, and the posture sensor is capable of utilizing the sensing device for posture recognition. FIG. 9 is a diagram illustrating wearing a posture sensor according to some embodiments of the present disclosure. As shown in FIG. 9, a posture sensor 900 may include a wearing body 910 and a sensing device 920. The wearing body 910 may wear a flexible sealing structure 922 of the sensing device 920 at a joint (e.g., a knuckle) of a user, and the sensing device 920 may be a sensing device described in any of the embodiments of the present disclosure. For example, a structure of the sensing device 920 shown in FIG. 9 may be similar to a structure of the sensing device 200 shown in FIG. 2. In some embodiments, the movement of the joint of the user may deform the flexible sealing structure 922 at the joint to produce a change in pressure, and the greater the movement of the joint, the greater deformation of the flexible sealing structure 922, and the greater the pressure of the pressure sensing unit 921. The pressure sensing unit 921 generates an electrical signal based on the change in the pressure, and the processor recognizes a deformation state of the flexible sealing structure 522 based on the electrical signal. The deformation state (e.g., a bending angle) of the flexible sealing structure 922 may be used to measure a movement angle of the user's joint, thereby enabling realizing the measurement of a posture of the joint.

In some embodiments, the wearing body 910 may include a glove, and when the user wears the glove, the sensing device 920 may be located on a side of a finger (e.g., on the back of the hand) and a flexible cavity 9221 of the sensing device 920 is located at a knuckle of the glove. The flexible cavity 9221 covers the knuckle along an extension direction. A connection tube 9222 may be disposed at a phalanx between two knuckles. In this setting, when the movement of the user's joint drives the flexible sealing structure 922 to deform, the deformation of the connection tube 9222 caused by the movement of the user's joint may be reduced, so as to reduce the effect of the deformation of the connection tube 9222 on the electrical signal.

In some embodiments, the posture sensor 900 may include a plurality of sensing devices 920, the plurality of sensing devices 920 corresponding to different fingers of the glove or different knuckles of the same finger. For example, the sensing device 920 may be provided at different knuckles of each finger of the glove to enable the posture measurement at different knuckles of each finger.

In some embodiments, a structure of the sensing device 920 may also be similar to a structure of the sensing device 400 shown in FIG. 4, i.e., the flexible sealing structure 922 of the sensing device 920 includes only the flexible cavity 9221 without the connection tube 9222 and an accommodation cavity (not shown in the figure), and the pressure sensing unit 921 is located at one end of the flexible cavity 9221. At this time, the flexible cavity 9221 may be set to be located at the knuckle and the flexible cavity 9221 covers the knuckle along the extension direction.

Figure 10:
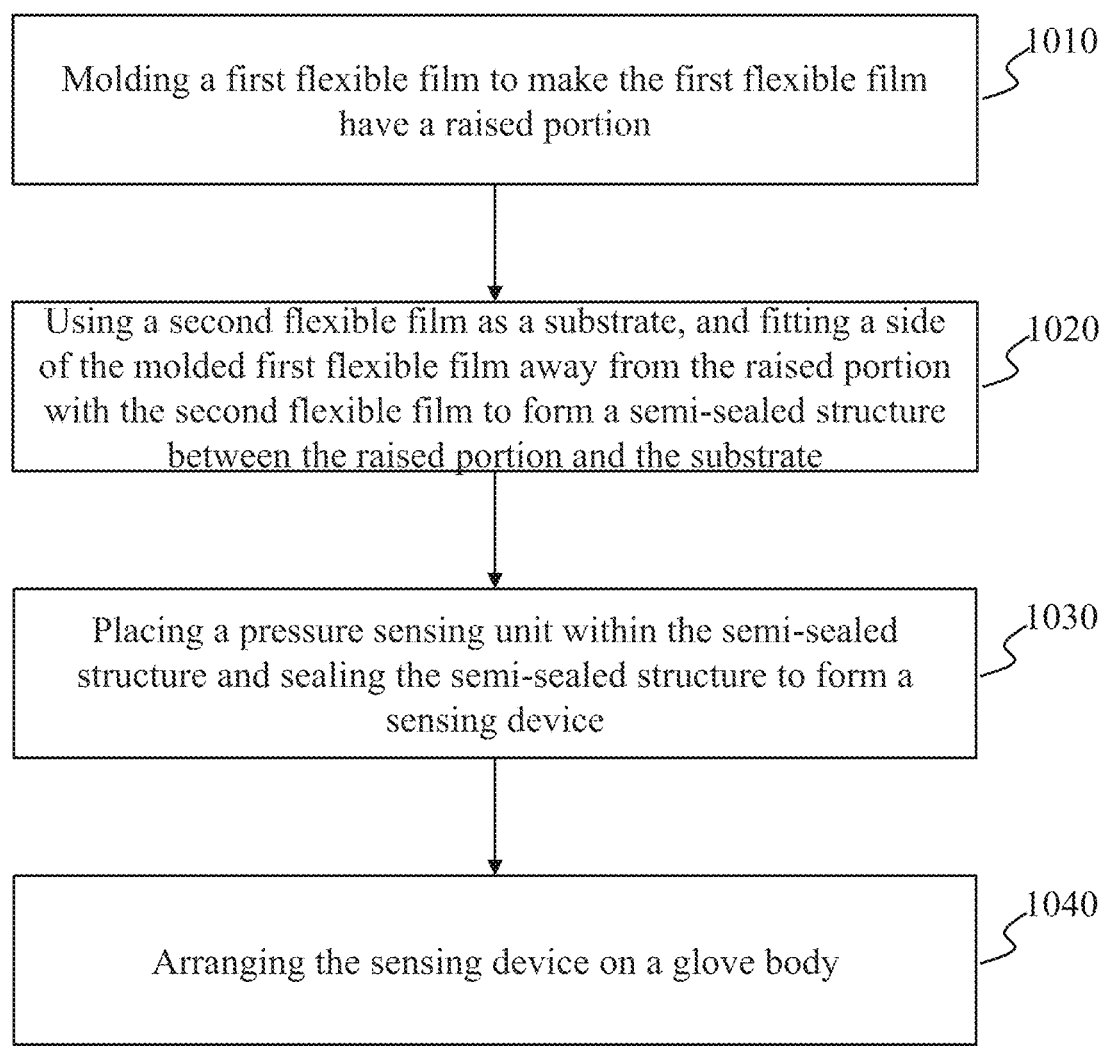
FIG. 10 is a flowchart illustrating an exemplary process for preparing a glove according to some embodiments of the present disclosure.

FIG. 10 is a schematic diagram illustrating an exemplary process for preparing a glove for capturing a hand action according to another embodiment of the present disclosure. As shown in FIG. 10, a process 1000 for preparing a glove for capturing a hand action may include following steps.

In step 1010, a first flexible film is molded to make the first flexible film have a raised portion.

Figure 11:
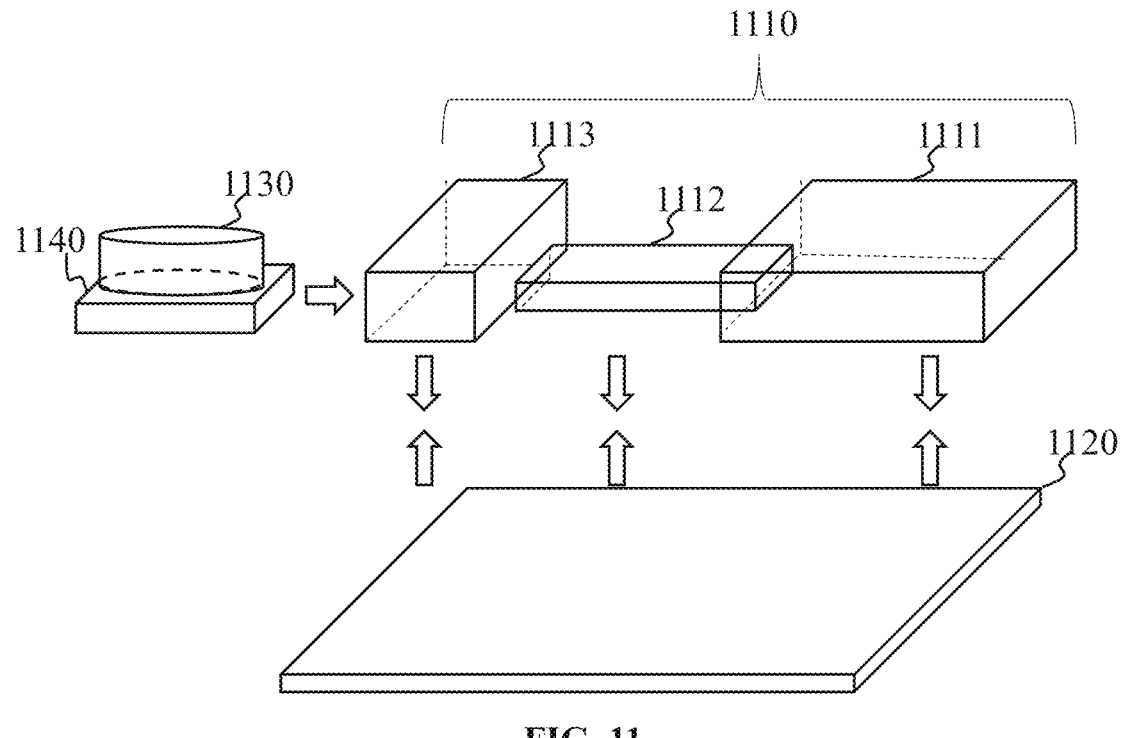
FIG. 11 is a schematic diagram illustrating a process for preparing a glove according to some embodiments of the present disclosure.

In some embodiments, the first flexible film may be a polymer flexible material. For example, thermoplastic polyurethane rubber (TPU), silicone, or the like. Molding the first flexible film may include molding the first flexible film using a molder. Exemplary molding manners may be a compression molding, an extrusion molding, an injection molding, or the like. The first flexible film having a raised portion is obtained by molding with a molder. The molder employed in molding may include a projection for causing the first flexible film to form the raised portion. In some embodiments, as shown in FIG. 11, the raised portion of the first flexible film 1110 may include a first raised portion 1111, a second raised portion 1112, and a third raised portion 1113. The first raised portion 1111 may be a raised portion containing a flexible cavity; the second raised portion 1112 may be a raised portion containing a connection tube; and the third raised portion 1113 may be a raised portion containing an accommodation cavity.

In step 1020, a second flexible film is used as a substrate, and a side of the molded first flexible film away from the raised portion is fitted with the second flexible film to form a semi-sealed structure between the raised portion and the substrate.

In some embodiments, the second flexible film may be a polymer flexible material. For example, thermoplastic polyurethane rubber (TPU), silicone, or the like. In some embodiments, the second flexible film may be the same material as the first flexible film. In some embodiments, a manner of fitting the side of the molded first flexible film away from the raised portion with the second flexible film may be a gluing fitting. An adhesive used for gluing may be silicone. In some embodiments, the raised portion includes a first raised portion, and after fitting the side of the molded first flexible film away from the raised portion with the second flexible film, the flexible cavity is formed between the first raised portion and the second flexible film, and the flexible cavity is a semi-sealed structure. In some embodiments, the raised portion includes a first raised portion, a second raised portion, and a third raised portion sequentially connected, and after fitting the side of the molded first flexible film away from the raised portion with the second flexible film, the flexible cavity is formed between the first raised portion and the second flexible film, the connection tube is formed between the second raised portion and the substrate, and the accommodation cavity is formed between the third raised portion and the second flexible film, and the accommodation cavity is a semi-sealed structure. As shown in FIG. 11, sides of the first raised portion 1111, the second raised portion 1112, and the third raised portion 1113 that are away from the raised portion are fitted with the second flexible film 1120. After the side of the molded first flexible film away from the raised portion fits with the second flexible film, a cavity between the two for accommodating fluid is formed. Exemplary fluids may include air. The semi-sealed structure refers to a presence of a notch in a structure after the fitting, which is used to accommodate a pressure sensing unit.

In some embodiments, the first flexible film may be formed by stitching films of different materials together. For example, a material for making the first raised portion may be a material with high tensile strength and greater flexibility, and a material for making the second raised portion and the third raised portion may be a material with lower tensile strength. In some embodiments, films of the different materials described above may be glued to form the first flexible film. An exemplary adhesive may include silicone.

In step 1030, the pressure sensing unit is placed within the semi-sealed structure and the semi-sealed structure is sealed to form a sensing device.

In some embodiments, the sealing may be achieved through an adhesive. For example, by silicone adhesive sealing. In some embodiments, the pressure sensing unit is placed on a circuit board, and the pressure sensing unit is placed within the semi-sealed structure and the semi-sealed structure is sealed. In some embodiments, a part of the circuit board that corresponds to the pressure sensing unit is placed inside the flexible cavity and the flexible cavity is sealed. As shown in FIG. 11, a pressure sensing unit 1130 may be placed on a circuit board 1140, and the pressure sensing unit 1130 and the circuit board 1140 are placed before the semi-sealed structure is sealed to form the sensing device. In some embodiments, the part of the circuit board corresponding to the pressure sensing unit may be placed within the accommodation cavity and the accommodation cavity may be sealed.

In step 1040, the sensing device is arranged on a glove body.

In some embodiments, the glove body includes a finger body and a palm body. In some embodiments, the flexible cavity may be provided at a knuckle of the finger body. In some embodiments, the accommodation cavity may be provided at a wrist position or a palm position. In some embodiments, the connection tube may extend from the finger body toward the palm body.

Figure 12:
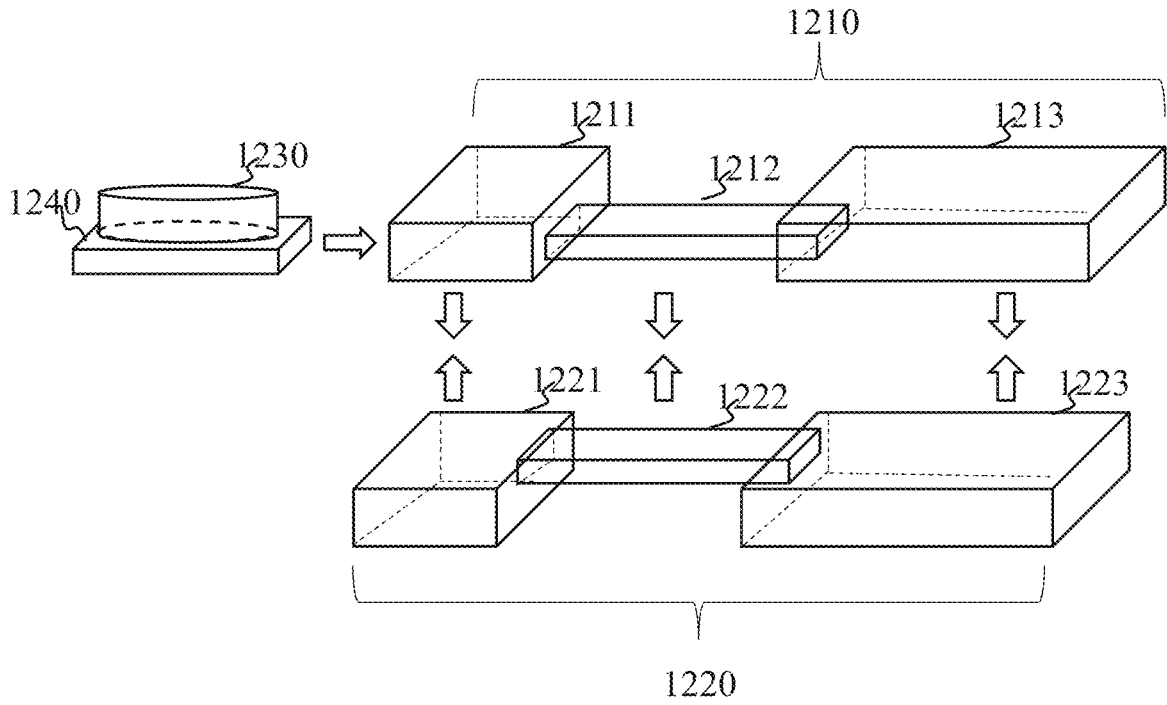
FIG. 12 is a schematic diagram illustrating a process for preparing another glove according to some embodiments of the pre.

FIG. 12 is a schematic diagram illustrating a process for preparing another glove according to some embodiments of the present disclosure. In some embodiments, a first flexible film and a second flexible film may be separately molded so that both the first flexible film and the second flexible film have raised portions, then fitting and subsequent operations are performed. As shown in FIG. 12, a first flexible film 1210 includes a first raised portion 1211, a second raised portion 1212, and a third raised portion 1213; a second flexible film 1220 includes a raised portion 1221, a raised portion 1222, and a raised portion 1223, a semi-sealed cavity is obtained by fitting the first raised portion 1211 with the raised portion 1221, fitting the second raised portion 1212 with the raised portion 1222, and fitting the third raised portion 1213 with the raised portion 1223, and then a pressure sensing unit 1230 and a circuit board 1240 are placed in the semi-sealed cavity and the semi-sealed cavity is sealed to obtain a sensing device.

FIG. 13 is a flowchart illustrating an exemplary process for preparing another glove according to some embodiments of the present disclosure. As shown in FIG. 13, a glove containing the sensing device shown in FIG. 4 may be prepared by the following process 1300.

In step 1310, a first flexible film is molded to make the first flexible film have a raised portion.

In step 1320, a second flexible film is used as a substrate, and a pressure sensing unit is disposed on the second flexible film, and a side of the molded first flexible film away from the raised portion is fitted with the second flexible film to form a sensing device.

In step 1330, the sensing device is arranged on a glove body.

For details of steps 1310 and 1330, please refer to FIG. 10, FIG. 11 and their related descriptions. A difference between the step 1320 and the steps described in FIG. 10 and FIG. 11 is that in the step 1320, the pressure sensing unit is first disposed on the second flexible film and then the side of the molded first flexible film away from the raised portion is fitted with the second flexible film, and there is only one raised portion. Steps of FIG. 13 allow for the generation of a sensing device that contains only a flexible cavity, which can simplify the flexible sealing structure while also avoiding the effect of deformation of other structures (e.g., a connection tube) on an electrical signal.

Figure 14:
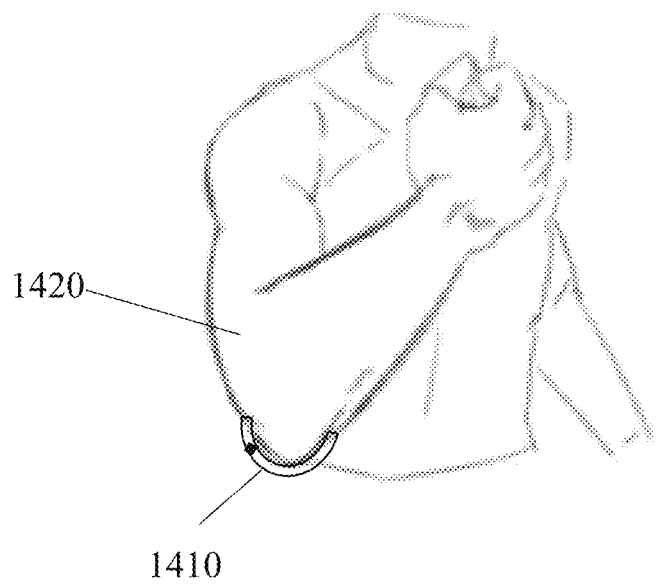
FIG. 14 is a diagram illustrating wearing another posture sensor according to some embodiments of the present disclosure.

FIG. 14 is a diagram illustrating wearing another posture sensor according to some embodiments of the present disclosure. In some embodiments, a wearing body 1410 may be other types of wearable devices in addition to a glove. For example, the wearing body 1410 may include a blouse, and the wearing body 1410 wears a sensing device 1420 at an elbow joint of a user (as shown in FIG. 14). As another example, the wearing body 1410 may include pants, and the wearing body 1410 wears the sensing device 1420 at a knee joint of the user. For different wearing bodies 1410, methods for wearing the sensing device 1420 at the user's joints are similar when, and will not be repeated herein.

Figure 15:
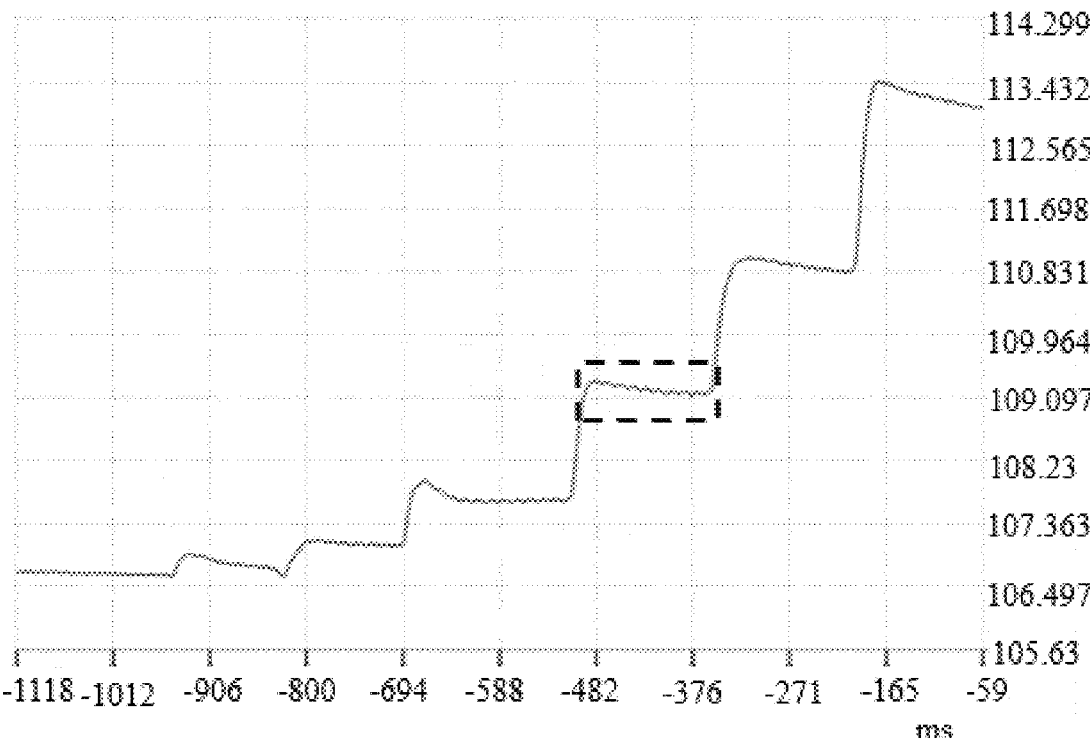
FIG. 15 is a graph illustrating a barometric curve of a sensing device when a wearing body is a glove according to some embodiments of the present disclosure.

FIG. 15 is a diagram illustrating a barometric curve of a sensing device when a wearing body is a glove according to some embodiments of the present disclosure. A barometric pressure sensor is described herein as an example of a pressure sensing unit, and in some embodiments, when the user's knuckle is bent at different angles, deformations of a flexible cavity of a sensing device are different, and the pressure sensing unit collects different barometric pressures. Thus, there is a certain correspondence relationship between a bending angle of the user's knuckle and a barometric pressure of the pressure sensing unit. Sec FIG. 15, a horizontal axis represents a time in ms and a vertical axis represents a barometric pressure of the pressure sensing unit in kPa. From FIG. 15, it can be seen that a barometric curve of the pressure sensing unit is distributed in a stepwise manner, in which bending angles of the knuckle corresponding to the steps gradually increase from left to right. It can be seen that a relationship between the bending angle of the user's knuckle and the barometric pressure of the pressure sensing unit may be approximated as a linear relationship. The larger the bending angle of the user's knuckle, the larger the barometric pressure of the pressure sensing unit; and the smaller the bending angle of the user's knuckle, the smaller the barometric pressure of the pressure sensing unit.

It should be noted that the reason that the barometric curve shown in FIG. 15 exhibits a step may be as follows. The bending angle of the knuckle is approximated to be 0 degrees in an initial state, and then the knuckle starts to move until the bending angle of the knuckle is $\beta_1$, and during this process, a barometric pressure of the pressure sensing unit increases, and a barometric curve of the pressure sensing unit corresponds to a rising edge of a step; then the bending angle of the knuckle is maintained at $\beta_1$, and the barometric pressure of the pressure sensing unit is basically maintained unchanged during this process, and the barometric curve of the pressure sensing unit corresponds to the high level of the step; furthermore, the knuckle continues to be bent based on the bending angle of $\beta_1$ to a bending angle of $\beta_2$, and during this process, the barometric curve of the pressure sensing unit continues to increase, and the barometric curve of the pressure sensing unit corresponds to a rising edge of a next step. In the same way, the bending angle of the joint is made to increase sequentially, that is to say, a plurality of consecutive steps are presented as shown in FIG. 14.

Figure 16:
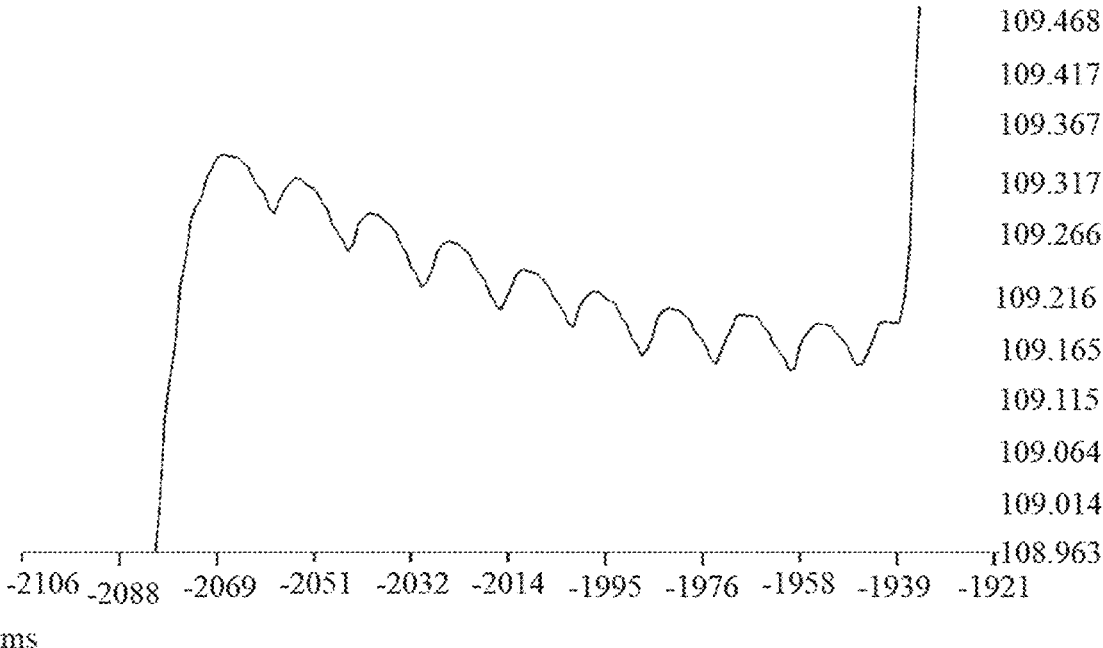
FIG. 16 is a graph illustrating a heart rate signal according to some embodiments of the present disclosure.

In some embodiments, when the sensing device is fixed to a position (e.g., a finger, a chest, a wrist, etc.) that can sense a physiological signal (e.g., a heart rate signal, a pulse signal, etc.), vibrations caused by these positions may lead to a deformation of the flexible sealing structure, thereby generating a change in barometric pressure, and the barometric pressure collected by the pressure sensing unit may reflect the physiological signal of the user. Taking the wearing body of a posture sensor as an exemplary glove, when the user wears the glove, the movement of a knuckle of the user deforms a flexible cavity and produces a change in a barometric pressure, and the pressure sensing unit responds to the change in the barometric pressure to generate an electrical signal, and a processor may recognize a physiological signal from the electrical signal. In some embodiments, a region through which arteries or veins of the human body pass may fluctuate in response to a heartbeat or pulse beat, and therefore, when the knuckle is not performing a bending action, it may also fluctuate slightly due to the heartbeat or the pulse beat. That is, the heartbeat or the pulse beat may cause a small fluctuating bending deformation at the knuckle. The pressure sensing unit is capable of generating the electrical signal based on the deformation of the knuckle (i.e., the deformation of the flexible cavity) caused by the heartbeat or the pulse beat. Thus, the electrical signal generated by the pressure sensing unit of the posture sensor may include at least an electrical signal generated based on the bending action of the knuckle and an electrical signal generated based on the heartbeat or the pulse beat. In conjunction with the description in FIG. 15, when the bending action of the knuckle is maintained at a certain bending angle, the barometric curve of the pressure sensing unit corresponds to a high level of a step, and at the high level of the barometric curve, the heartbeat or the pulse beat may cause a fluctuation in the barometric pressure. For example, this fluctuation of a barometric pressure may be as shown by a dashed box in FIG. 15. It can be seen that physiological signal is included in the electrical signal generated by the pressure sensing unit during the movement of the knuckle. The physiological signal may reflect physiological information of the user, for example, heart rate information, pulse information. FIG. 16 is a diagram illustrating a heart rate signal according to some embodiments of the present disclosure. The diagram of the heart rate signal shown in FIG. 16 may be recognized and extracted from the barometric curve in FIG. 15. That is, FIG. 16 is an enlarged view of a curve in the dashed box shown in FIG. 15. FIG. 16 shows the heart rate signal measured by a pressure sensing unit when a sensing device is fixed at a knuckle, and a frequency of the human heartbeat is about 71 Hz.

Figure 17:
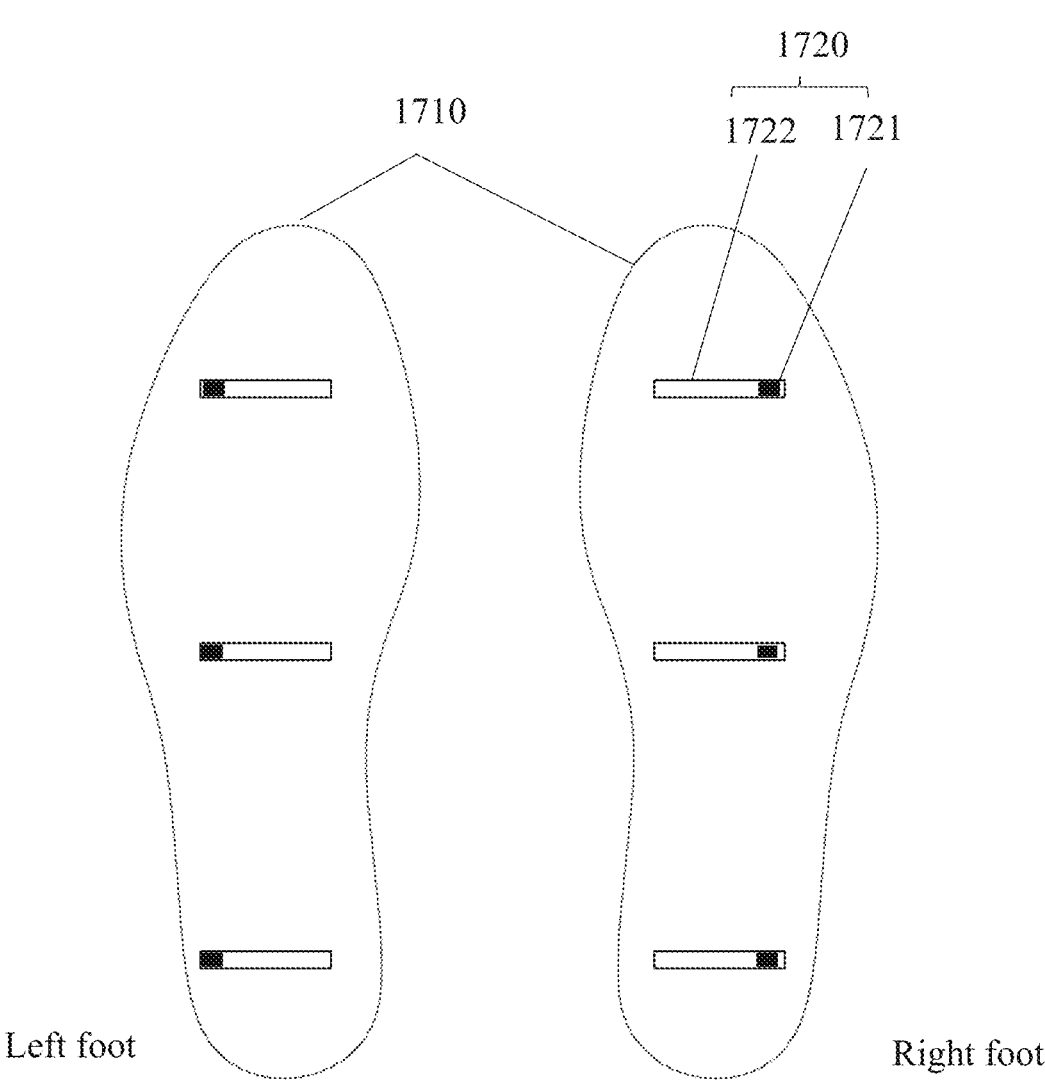
FIG. 17 is a schematic diagram illustrating an exemplary structure of a running action sensor according to some embodiments of the present disclosure.

The sensing device provided in embodiments of the present disclosure may be used for a running action sensor, and the running action sensor is capable of utilizing the sensing device for running action recognition. FIG. 17 is a diagram illustrating an exemplary structure of a running action sensor according to some embodiments of the present disclosure. As shown in FIG. 17, a running action sensor 1700 may include a wearing body 1710 and a sensing device 1720, and the wearing body 1710 may wear a flexible sealing structure 1722 of the sensing device 1720 on a foot region of a user. The sensing device 1720 may be a sensing device described in any of the embodiments of the present disclosure. For example, the sensing device 1720 shown in FIG. 17 may be similar to the sensing device 400 shown in FIG. 4. In other embodiments, the sensing device 1720 may also be similar to the sensing device 200 shown in FIG. 2.

In some embodiments, the wearing body 1710 may include an insole (as shown in FIG. 17) and/or a running shoe, a plurality of sensing devices 1720 may be distributed in an array on the insole and/or the running shoe, and a plurality of flexible sealing structures 1722 (e.g., flexible cavities) are located at different positions on the foot region, respectively. For example, the plurality of flexible sealing structures 1722 (e.g., flexible cavities) are located at a forefoot, a palm, and a heel of the foot region, respectively. In some embodiments, when the user's feet leave the ground and/or land on the ground during a running process, the flexible sealing structures 1722 in different parts of the foot region may deform to generate different changes in the barometric pressure, and the pressure sensing unit 1721 generates different electrical signals based on the changes in the barometric pressure, and a processor recognizes deformation states of corresponding flexible sealing structures 1722 based on the electrical signals. By analyzing the deformation state of each flexible sealing structure 1722 (or a barometric pressure of the pressure sensing unit 1721), it is possible to learn a landing position of the foot. In some embodiments, the landing position of the foot during the running process may be different, for example, it may be that the forefoot lands, then transitions to the palm, and lastly the heel lands; or the heel lands first, then transitions to the palm, and finally the forefoot lands. The sensing device 1720 may be provided at each of the three positions of the insole or the running shoe corresponding to the foot (as shown in FIG. 17), and the landing position of the foot may be determined by analyzing barometric pressure information of the sensing device 1720 at the three positions. For example, the landing position of the foot may be determined based on time points at which the sensing device 1720 generates barometric pressures at different positions during a landing action. If a time point at which the sensing device 1720 at the heel generates an electrical signal is earlier than that of the forefoot, it may be indicated that the landing position of the foot is the heel; and vice versa, the landing position of the foot is the forefoot. As another example, by analyzing the barometric pressures generated by the sensing device 1720 at different positions during a landing process, the forces exerted by different parts of the foot may be determined. In some embodiments, it is also possible to determine a balanced degree of force generation in the right and left feet by comparing barometric pressures of the pressure sensing units 1721 at the same position of the left and right feet. At this point, a distribution of arrays of the plurality of sensing devices 1720 on the left and the right feet may be symmetrical.

Figure 18:
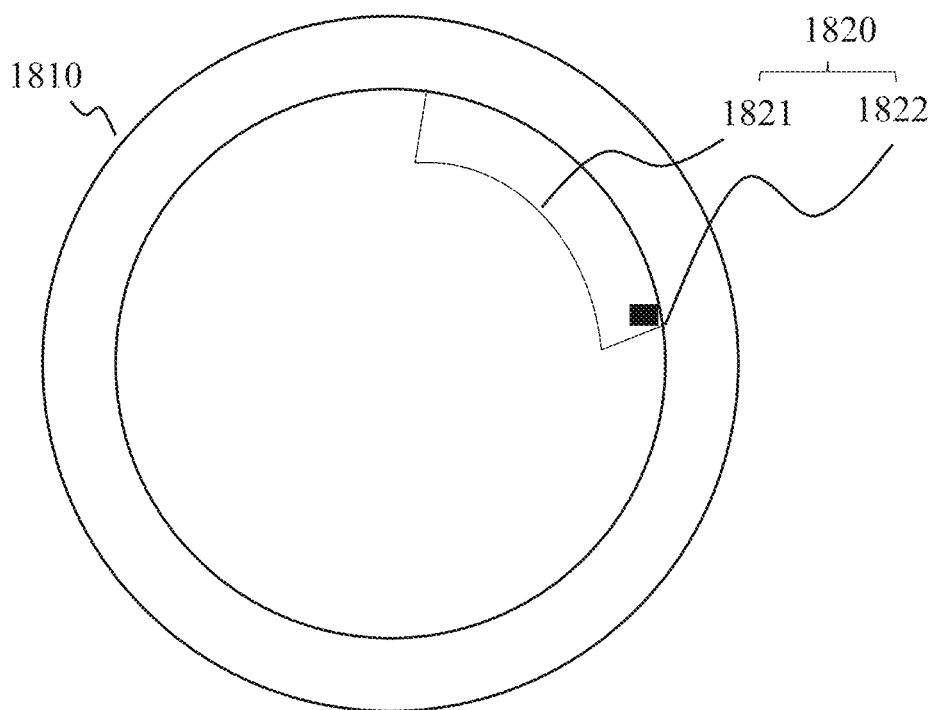
FIG. 18 is a schematic diagram illustrating an exemplary structure of a wrist guard containing the sensing device according to some embodiments of the present disclosure.

FIG. 18 is a diagram illustrating an exemplary structure of a wrist guard containing a sensing device according to some embodiments of the present disclosure. As shown in FIG. 18, a wrist guard 1800 may include a wrist guard body 1810 and a sensing device 1820. The wrist guard body 1810 may be a flexible ring-like structure composed of a textile material, plastic, rubber, or other polymer materials. A dimension of the wrist guard body 1810 may vary with a dimension of a user's wrist joint. In some embodiments, the wrist guard 1800 may include a plurality of sensing devices 1820, and the plurality of sensing devices 1820 circumscribe the wrist guard body 1810 to enable omnidirectional acquisition of the movement state of a wrist. The plurality of sensing devices 1820 may also be spaced along a circumference of the wrist guard body 1810, or the plurality of sensing devices may be spaced side-by-side, etc. In some embodiments, the wrist guard 1800 may include only one sensing device 1820, and a flexible sealing structure 1821 of the sensing device 1820 may be disposed around the circumference of the wrist guard body 1810 to omnidirectionally obtain the movement state of the wrist. In some embodiments, one or more sensing devices 1820 are distributed on either an inner rim side (a side that is in contact with the user's body when worn by the user) or an outer rim side (a side that is back away from the user's body when worn by the user) of the wrist guard body 1810. In some embodiments, the wrist guard body 1810 may be a multi-layered structure, and the one or more sensing devices 1820 may be disposed between the multi-layered structure of the wrist guard body 1810. When the user's wrist moves, a wrist joint bends, and the flexible sealing structure 1821 of the sensing device 1820 may deform with the bending of the wrist joint, leading to a change in the pressure. The pressure sensing unit 1822 may generate an electrical signal based on the change in pressure inside the flexible sealing structure 1821, and a processor may recognize a deformation state of a corresponding flexible sealing structure 1821 based on the electrical signal. Further, by analyzing a deformation state (or a pressure of the pressure sensing unit 1822) of each flexible sealing structure 1821, the movement state of the wrist joint may be obtained. For example, a bending angle of the wrist joint, a force exerted by the wrist joint, or the like, may be determined by different electrical signals. The wrist guard 1800 may also include an elastic structure (not shown in the figure) for adapting the circumferential dimension of the wrist guard 1800 to a dimension of the wrist of the user, so that the wrist guard 1800 fits the wrist for better action state recognition.

The sensing device provided in the present disclosure may also be applied to elbow pads, shoulder pads, knee pads, socks, etc., which are similar to the principle of gloves and wrist guards and will not be repeated in the present disclosure.

Figure 19:
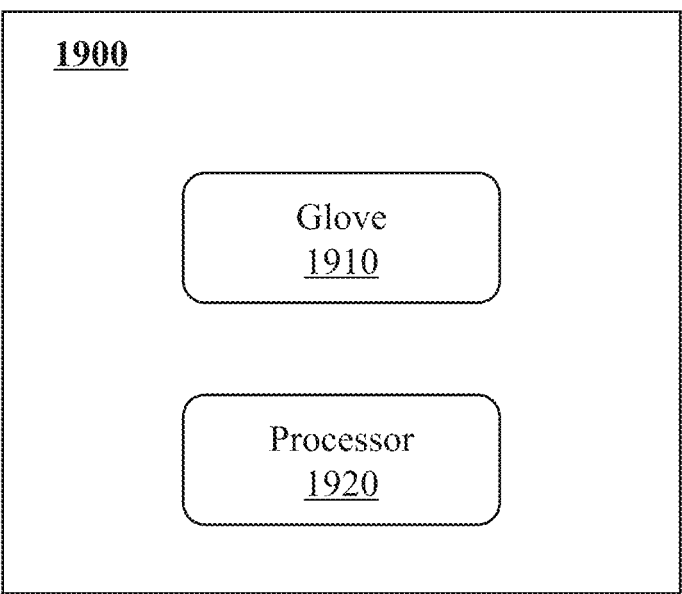
FIG. 19 is a block diagram illustrating an exemplary system for recognizing a hand action according to some embodiments of the present disclosure.

FIG. 19 is a block diagram illustrating an exemplary system for recognizing a hand action according to some embodiments of the present disclosure.

Embodiments of the present disclosure disclose a system for recognizing a hand action. As shown in FIG. 19, a system 1900 for recognizing a hand action may include a glove 1910 and a processor 1920. The glove 1910 may be any of the gloves in the embodiments described above, configured to be worn on a user's hand and to generate an electrical signal based on the movement of the user's hand. The processor 1920 may be configured to determine a hand action of the user based on the electrical signal. In some embodiments, the electrical signal includes at least a signal generated when at least two phalanges of a finger move to drive a knuckle to bend. For example, the electrical signal may include an electrical level generated when the knuckle bends. In some embodiments, the processor may determine a bending angle of the knuckle based on the electrical signal. For example, different electrical levels may correspond to different bending angles of the knuckle, and the processor may determine a bending angle of the knuckle corresponding to each electrical signal by querying a preset relationship between an electrical signal and a bending angle of a knuckle. In some embodiments, the hand action of the user may be determined by setting up a sensing device at each knuckle in the glove to obtain a deformation state of the sensing device corresponding to each knuckle.

Figure 20:
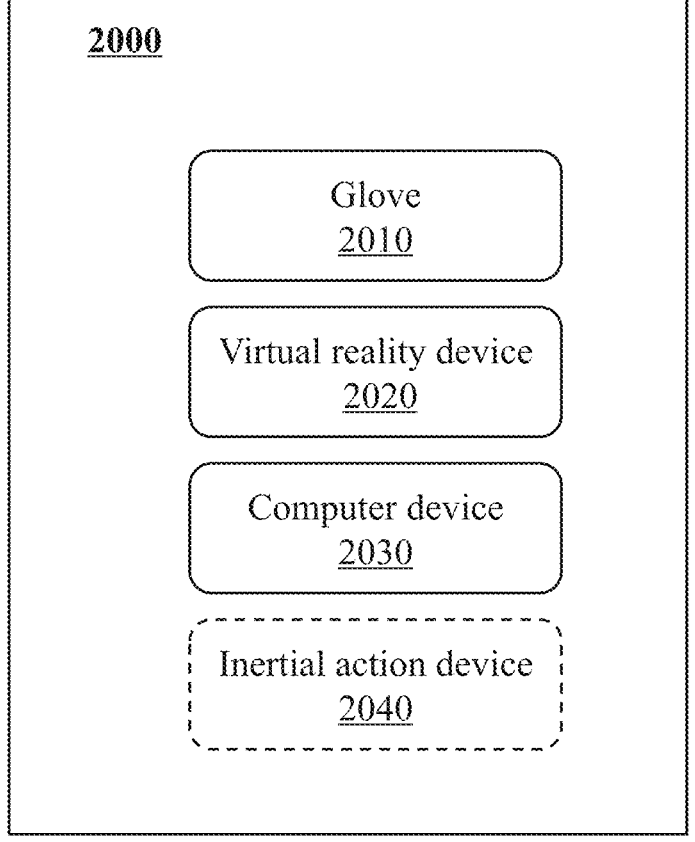
FIG. 20 is a block diagram illustrating an exemplary virtual reality system based on action capture according to some embodiments of the present disclosure.

FIG. 20 is a block diagram illustrating an exemplary virtual reality system based on action capture according to some embodiments of the present disclosure.

Embodiments of the present disclosure disclose a virtual reality system based on action capture. As shown in FIG. 20, a virtual reality system 2000 based on action capture may include a glove 2010, a virtual reality device 2020, and a computer device 2030. The glove 2010 may be any of the gloves in the above embodiments configured to capture a hand action of a user and provide feedback on virtual reality information based on the hand action of the user. Exemplary feedback may include 3D modeling of the hand and hand action of the user, and mimicking the hand action of the user in virtual reality information (e.g., an avatar). The virtual reality device 2020 may be configured to display the virtual reality information. The virtual reality information may include a virtual reality image and associated parameters. Exemplary virtual reality devices may include VR glasses, a VR helmet, or the like. The computer device 2030 may be communicatively connected to a glove and a virtual reality device. The computer device may act as a relay for communication between the glove and the virtual reality device, or as a processing device (processor) for individual pieces of data. For example, the computer device may convert an electrical signal into a bending angle of a knuckle, generate the virtual reality information based on the bending angle of the knuckle, etc. In some embodiments, the computer device may be a microcontroller, or other device with data processing capabilities.

In some embodiments, the virtual reality system 2000 based on action capture may further include an inertial action device 2040, the inertial action device 2040 including a plurality of action-capturing modules secured to the user's body, each action-capturing module including an action-capturing sensor. The action-capturing module may be configured to capture other actions of the user, such as an action of a knee joint, an action of an elbow joint, an action of a wrist joint, or the like. The inertial action device may introduce information about the movement of other parts of the user, to improve the system's perception of the user's movement, and have a certain protective effect. In some embodiments, the inertial action device includes a triaxial MEMS (Micro-Electro-Mechanical Systems) acceleration sensing device, a triaxial MEMS angular velocity sensing device, a triaxial MEMS magnetometer, a data filtering sensing device, and a microprocessor. The triaxial MEMS acceleration sensing device, the triaxial MEMS angular velocity sensing device, and the triaxial MEMS magnetometer are all communicatively connected to the data filtering sensing device, and the data filtering sensing device is communicatively connected to the microprocessor.

Beneficial effects that may be brought about by the embodiments of the present disclosure include, but are not limited to: (1) by setting the pressure sensing unit in the closed cavity formed by the flexible sealing structure, the pressure sensing unit is capable of converting the change in the pressure generated by the deformation of the flexible sealing structure into an electrical signal, which makes a structure of the sensing device simpler, facilitates mass production and reduces the cost, and at the same time allows the flexible sealing structure (e.g., the flexible cavity or the accommodation cavity) to protect the pressure sensing unit and internal components of the pressure sensing unit and avoid the damage of the sensing device; (2) by setting a material and structure of the flexible sealing structure, as well as a relationship between parameters of the flexible cavity and parameters of the connection tube (e.g., the diameter of the flexible cavity is larger than the diameter of the connection tube, and the Young's modulus of the flexible cavity is smaller than the Young's modulus of the connection tube), the influence of the deformation of the connection tube on the electrical signal can be reduced. In addition, when the pressure sensing unit is located in the accommodation cavity, the sensitivity of the sensing device can also be improved by setting a relationship between the volume of the accommodation cavity and the volume of the flexible cavity; (3) the sensing device is fixed to the wearing body, e.g., the sensing device is fixed to the joint through the glove, which allows action capture and posture measurement of the user's movement, thus realizing the measurement of the bending angle of the joint and the recognition of the physiological signal of the human body; (4) the glove obtains the bending angle of the knuckle through the sensing device, and capture the hand action of the user under the premise of a certain degree of comfort; (5) the glove is applied in a system for recognizing a hand action as well as in a virtual reality system in order to realize the recognition of the hand action and the three-dimensional simulation. It should be noted that the beneficial effects that may be produced by different embodiments are different, and the beneficial effects that may be produced in different embodiments may be any one or a combination of any one or a combination of any of the foregoing, or any other beneficial effect that may be obtained.

The basic concepts have been described above, and it is apparent to those skilled in the art that the foregoing detailed disclosure is intended as an example only and does not constitute a limitation of the present disclosure. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

Moreover, certain terminology has been used to describe embodiments of the present disclosure. As "an embodiment", "one embodiment", and/or "some embodiments" means a feature, structure, or characteristic associated with at least one embodiment of the present disclosure. Accordingly, it should be emphasized and noted that two or more references to "an embodiment" or "one embodiment" in different locations in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A sensing device, comprising:

a flexible sealing structure provided at a joint of a user, the flexible sealing structure including a flexible cavity, a connection tube, and an accommodation cavity, the flexible cavity, the connection tube, and the accommodation cavity together forming a closed cavity filled with fluid inside; and a pressure sensing unit, the pressure sensing unit being in fluid communication with the flexible sealing structure, wherein:

the pressure sensing unit is disposed within the closed cavity of the flexible sealing structure and accommodated in the accommodation cavity, a pressure of the fluid inside the closed cavity of the flexible sealing structure changes in response to a deformation of the joint of the user, and the pressure sensing unit converts a change in the pressure of the fluid into an electrical signal, the flexible cavity is connected to the accommodation cavity through the connection tube, and the Young's modulus of the flexible cavity is smaller than the Young's modulus of the connection tube.

2. The sensing device of claim 1, wherein a diameter of the flexible cavity is greater than a diameter of the connection tube.

3. The sensing device of claim 1, wherein a ratio of the Young's modulus of the flexible cavity to the Young's modulus of the connection tube is in a range of 1:1 to 1:10.

4. The sensing device of claim 1, wherein a volume of the accommodation cavity is smaller than a volume of the flexible cavity.

5. The sensing device of claim 4, wherein a ratio of the volume of the accommodation cavity to the volume of the flexible cavity does not exceed 0.5.

6. The sensing device of claim 1, wherein the accommodation cavity is made of a hard material, and the flexible cavity is made of an elastic material.

7. A wearable device, comprising:

a wearing body;

at least one sensing device provided on the wearing body, wherein the at least one sensing device includes:

a flexible sealing structure provided at a joint of a user, the flexible sealing structure including a flexible cavity, a connection tube, and an accommodation cavity, the flexible cavity, the connection tube, and the accommodation cavity together forming a closed cavity filled with fluid inside; and a pressure sensing unit, the pressure sensing unit being in fluid communication with the flexible sealing structure, wherein the pressure sensing unit is disposed within the closed cavity of the flexible sealing structure and accommodated in the accommodation cavity, a pressure of the fluid inside the closed cavity of the flexible sealing structure changing in response to a deformation of the joint of the user, the pressure sensing unit converting a change in the pressure of the fluid into an electrical signal, the flexible cavity is connected to the accommodation cavity through the connection tube, and the Young's modulus of the flexible cavity is smaller than the Young's modulus of the connection tube; and a processor, configured to recognize a bending angle of the joint of the user based on the electrical signal.

8. A glove for capturing a hand action, comprising:

a glove body, including a finger body and a palm body;

at least one sensing device provided on the glove body, wherein the at least one sensing device includes:

a flexible sealing structure provided at a knuckle of a user, the flexible sealing structure including a flexible cavity, a connection tube, and an accommodation cavity, the flexible cavity, the connection tube, and the accommodation cavity together forming a closed cavity filled with fluid inside; and a pressure sensing unit, the pressure sensing unit being in fluid communication with the flexible sealing structure, wherein the pressure sensing unit is disposed within the closed cavity of the flexible sealing structure and accommodated in the accommodation cavity, and a pressure of the fluid inside the closed cavity of the flexible sealing structure changing in response to a deformation of the knuckle of the user, the pressure sensing unit converting a change in the pressure of the fluid into an electrical signal, the flexible cavity is connected to the accommodation cavity through the connection tube, and the Young's modulus of the flexible cavity is smaller than the Young's modulus of the connection tube; and a processor, configured to recognize the hand action of the user based on the electrical signal.

9. The glove of claim 8, wherein at least one knuckle of each finger of the user corresponds to one flexible sealing structure when the user wears the glove.

10. The glove of claim 8, wherein the flexible sealing structure is removably connected to the glove body and is located inside or outside of the glove body.

11. The glove of claim 8, wherein the flexible cavity is provided at a knuckle of the finger body and the connection tube extends from the finger body toward the palm body.

12. The glove of claim 8, further comprising a circuit board, wherein the circuit board is disposed on a dorsal side of the hand of the palm body, and the pressure sensing unit is disposed on the circuit board.

* * * * *